(12) United States Patent
Diehn et al.

(10) Patent No.: US 10,378,970 B2
(45) Date of Patent: Aug. 13, 2019

(54) THERMOCHROMIC LIQUID CRYSTAL TEMPERATURE INDICATOR

(71) Applicant: Prasidiux, LLC, Arlington, VA (US)

(72) Inventors: Kevin K. Diehn, Towson, MD (US); Bani H. Cipriano, Rockville, MD (US); Rel S. Ambrozy, Arlington, VA (US)

(73) Assignee: Prasidiux, LLC, Arlington, VA (US)

(*) Notice: Subject to any disclaimer, the term of this patent is extended or adjusted under 35 U.S.C. 154(b) by 84 days.

(21) Appl. No.: 14/875,517

(22) Filed: Oct. 5, 2015

(65) Prior Publication Data

US 2016/0245707 A1 Aug. 25, 2016

Related U.S. Application Data

(60) Provisional application No. 62/120,207, filed on Feb. 24, 2015.

(51) Int. Cl.
  *G01K 11/12* (2006.01)
  *G01K 11/16* (2006.01)
  *G01K 1/08* (2006.01)

(52) U.S. Cl.
  CPC .............. *G01K 11/165* (2013.01); *G01K 1/08* (2013.01)

(58) Field of Classification Search
  CPC ...... G01K 11/12; G01K 11/165; G01K 11/08; G01K 11/16

(Continued)

(56) References Cited

U.S. PATENT DOCUMENTS 3,594,126 A * 7/1971 Cartmell et al. ....... C09K 19/36
                                                      116/201
3,620,889 A * 11/1971 Baltzer .................. B41M 5/281
                                                      156/145

(Continued)

FOREIGN PATENT DOCUMENTS

CN   2038996274 U * 10/2014
EP   0 412 687 A1   2/1991

(Continued)

OTHER PUBLICATIONS

International Search Report and Written Opinion dated Dec. 4, 2015 issued in International Application No. PCT/US15/54245.

(Continued)

*Primary Examiner* — Gail Kaplan Verbitsky
(74) *Attorney, Agent, or Firm* — Fox Rothschild LLP

(57) ABSTRACT

A new and useful thermochromic liquid crystal Indicator is disclosed that provides an indication of the temperature of the Object to which the Indicator is attached, and is an improvement over the existing art for at least the fact that the impact of ambient air circulating around the Indicator and circulating the Object is reduced by several means, such as i) the use of a novel cap or housing to isolate the liquid crystal Structure from ambient air and from touching or ii) using a novel liquid crystal formulation that reduces the reaction time of the thermochromic liquid crystal contained in the Indicator to changing temperatures conveyed by the ambient air. The new and useful liquid crystal Indicator can also employ either a template or a colored filter as a mask that narrows the colors and narrows the range of temperatures indicated by the Indicator. Further, the new and useful Indicator can also employ a new manner in which to indicate that a predetermined temperature or predetermined temperature range has been reached in that it eliminates the confu- (Continued)

sion arising from the use of multiple temperature indicating panels that were present in the prior art devices.

30 Claims, 15 Drawing Sheets

(58) Field of Classification Search
USPC .......................................................... 116/216
See application file for complete search history.

(56) References Cited

U.S. PATENT DOCUMENTS

| | | | |
|---|---|---|---|
| 3,864,976 A | 2/1975 | Parker | |
| 3,893,340 A * | 7/1975 | Parker | G01K 1/143 |
| | | | 116/207 |
| 3,965,742 A | 6/1976 | Parker | |
| 4,030,482 A | 6/1977 | Navato | |
| 4,198,861 A | 4/1980 | Mung-Kuen Luk | |
| 4,279,152 A | 7/1981 | Crossland | |
| 4,294,524 A * | 10/1981 | Stolov | F21S 10/02 |
| | | | 353/84 |
| 4,302,971 A * | 12/1981 | Luk | G01K 11/165 |
| | | | 374/162 |
| 4,310,577 A * | 1/1982 | Davison | B41M 5/281 |
| | | | 374/E11.022 |
| 4,345,470 A | 8/1982 | Hof et al. | |
| 4,469,452 A | 9/1984 | Sharpless et al. | |
| 4,509,533 A * | 4/1985 | Chervitz | G01K 11/165 |
| | | | 374/162 |
| 4,651,749 A * | 3/1987 | Sagi | A61B 5/015 |
| | | | 600/549 |
| 4,738,549 A | 4/1988 | Plimpton | |
| 4,863,282 A * | 9/1989 | Rickson | G01J 1/50 |
| | | | 374/162 |
| 5,120,137 A | 6/1992 | Ou-Yang | |
| 5,370,841 A * | 12/1994 | McDonnell | G01R 29/0814 |
| | | | 374/162 |
| 5,738,442 A * | 4/1998 | Paron | G01K 11/165 |
| | | | 374/150 |
| 6,700,100 B2 | 3/2004 | Lerner | |
| 7,169,517 B2 | 1/2007 | Yoo et al. | |
| 7,857,507 B2 * | 12/2010 | Quinn | A01K 29/005 |
| | | | 374/100 |
| 8,203,676 B2 | 6/2012 | Uchiyama et al. | |
| 8,368,824 B2 * | 2/2013 | Nagatsu | G02F 1/13363 |
| | | | 349/9 |
| 8,958,022 B2 * | 2/2015 | Youk | G02B 6/0083 |
| | | | 349/161 |
| 9,534,964 B2 * | 1/2017 | Newport | G01K 11/12 |
| 9,902,861 B2 * | 2/2018 | Lane | C09D 5/14 |
| 2002/0030786 A1 * | 3/2002 | Stephenson | G02F 1/1334 |
| | | | 349/185 |
| 2003/0086474 A1 * | 5/2003 | Hammarth | G01K 1/14 |
| | | | 374/150 |
| 2007/0126974 A1 * | 6/2007 | Lai | G02F 1/133382 |
| | | | 349/161 |
| 2007/0132898 A1 * | 6/2007 | Anderson | G01K 11/165 |
| | | | 349/21 |
| 2008/0094550 A1 * | 4/2008 | Tawaraya | G02B 5/201 |
| | | | 349/106 |
| 2008/0142529 A1 * | 6/2008 | LaGuardia | B65D 81/3874 |
| | | | 220/592.2 |
| 2008/0144699 A1 * | 6/2008 | Plevich | C09D 5/26 |
| | | | 374/162 |
| 2008/0190138 A1 * | 8/2008 | DiCiacco | G01K 11/165 |
| | | | 63/14.9 |
| 2009/0183669 A1 * | 7/2009 | Scott | G01K 11/16 |
| | | | 116/216 |
| 2010/0268112 A1 * | 10/2010 | Short | G01K 11/14 |
| | | | 600/549 |
| 2015/0173679 A1 * | 6/2015 | West | A61B 5/6807 |
| | | | 600/549 |
| 2015/0177610 A1 * | 6/2015 | Li | G03F 1/38 |
| | | | 430/5 |
| 2016/0187703 A1 * | 6/2016 | Tang | G02F 1/13394 |
| | | | 349/58 |
| 2017/0233653 A1 * | 8/2017 | Kikuchi | C09K 19/3402 |
| | | | 362/257 |

FOREIGN PATENT DOCUMENTS

| | | | |
|---|---|---|---|
| EP | 2502039 A1 * | 9/2012 | |
| GB | 2 165 646 A | 4/1986 | |
| GB | 2 240 846 A | 8/1991 | |
| NL | 8105533 | 7/1983 | |

OTHER PUBLICATIONS

Extended European Search Report, EP Appln No. 15883621.3, dated Sep. 14, 2018.

* cited by examiner

ACTION MESSAGES:
- LOAD
- LOAD TIC PANEL
- LOAD PANEL
- LOAD PCM
- OK
- OK TO LOAD
- READY
- READY TO USE
- READY TO LOAD
- READY FOR USE
- ✓
- ☑

DO NOT TAKE ACTION MESSAGES:
- DO NOT LOAD
- DO NOT LOAD PANEL
- DO NOT LOAD TIC
- DO NOT LOAD TIC PANEL
- NO!
- PANEL TOO COLD
- CAUTION
- DANGER
- WARNING
- X
- ☒

US 10,378,970 B2

THERMOCHROMIC LIQUID CRYSTAL TEMPERATURE INDICATOR

This application claims the benefit under 35 U.S.C. § 119 of U.S. provisional patent application Ser. No. 62/120,207 filed Feb. 24, 2015 entitled "Thermochromic Liquid Crystal Temperature Indicator," which is hereby incorporated by reference in its entirety.

GOVERNMENT RIGHTS

Certain aspects or embodiments of the disclosed invention may have been made with Government support under SBIR grant Award No. IIP-1431014 awarded by the National Science Foundation. The Government has certain rights in those certain aspects or embodiments of the disclosed invention.

BACKGROUND OF THE INVENTION

1. Field of the Invention

Embodiments of the invention relate to a temperature "Indicator". More particularly, the present inventions and various embodiments disclosed herein pertain to, for example, an embodiment of a novel Indicator comprised of a novel indicator strip containing thermochromic liquid crystal; and the thermochromic liquid crystal in the indicator strip indicates when a predetermined temperature has been reached by changing to a certain or predetermined color (the "novel Indicator strip" or "novel Indicator structure"). Another embodiment of the present inventions pertain to a novel indicator having a novel indicator housing used in conjunction with either a prior art Indicator Strip or in conjunction with the novel Indicator Strip/Structure. Embodiments containing one of or both a novel Indicator strip/structure and a novel Indicator housing will hereinafter be referred to as a novel Indicator.

2. Discussion of the Related Art

The present inventions relate to temperature monitoring of perishable, or temperature sensitive products, or objects for which temperature is important to its function (collectively "temperature sensitive product" or "Product") in which the useful life of that Product is dependent upon a function of its cumulative exposure to a particular stimulus, such as temperature, over a period of time through the use of Indicators. Although such Indicators may be used in multiple scenarios, from forehead thermometers to fish tank thermometers, for purposes of illustration only, the detailed disclosure in this application will focus on the use the Indicators in conjunction with Objects that should, for example, be used to ensure the safe shipment and/or storage of the temperature sensitive product (the "Object"). And more particularly, this application will use as an example of the Object a panel filled with Phase Change Material ("PCM"), wherein the Indicator is used in conjunction with PCM-filled panels (i.e., the indicator is used to monitor these Objects and indicate when they reach a predetermined temperature or temperature range) so as to ensure that the Product being shipped is packed for shipment within its proper temperature range.

By way of example only, many types of temperature sensitive products, such as pharmaceuticals (and more specifically vaccines), must be maintained within a temperature safe zone of between 2° C. and 8° C. from the time of manufacture until they are used. If such Objects are exposed to temperatures that are either below or above their respective safe zone, the Products can spoil and/or become inert. Therefore, it is important to insulate such Products by maintaining them in a temperature-constant environment when they are being shipped or stored. To aid in shipping the Products in a temperature constant environment that protects that Product from harmful temperature excursions, an entire industry has arisen around the manufacture and use of a "cooler system." These cooler systems employ a box (typically manufactured using corrugated and/or insulated walls), wherein the box contains removable hollow panels that aid in the insulation of the box. These hollow panels are typically made of highly durable plastic, and are filled with an insulating material. Preferably, the insulating material used is a Phase Change Material (or "PCM"), which as its name implies, changes phases as it moves through various temperature ranges. These phases include a solid when the PCM is frozen, ½ frozen and ½ liquid when melting, and is a liquid when all the PCM warms past its melt point.

A cooler system is typically a box made up of any number of PCM-filled panels. For example, the cooler system can include six PCM-filled panels that are arranged in the shape of a cube. The PCM has several different operating temperatures, but for the sake of illustration herein, the PCM-filled panels are pre-conditioned to a temperature of −20° C. prior to their use. Once pre-conditioned, the PCM-filled panel is removed from the freezer unit and is placed in a warmer environment so that it can thaw to its "Packing Temperature Range" or "PTR". The Packing Temperature Range is the temperature range at which the cooler system is assembled, and is also the temperature range at which the Product being shipped can be safely inserted into the cooler system. For example, when a cooler system or box is packed with six PCM-filled panels, it can maintain the 2° C. and 8° C. temperature (by way of example only, the temperature necessary for the shipment of vaccines) for possibly as long as ninety six hours. To have a cooler system that employs PCM-filled panels maintain that 2° C. to 8° C. temperature inside the cooler system for the length of time it takes to transport the Product, the manufacturers of the PCM-filled panels recommend that the cooler system be assembled, and the temperature sensitive product be placed inside assembled cooler system, when the temperature of the PCM-filled panels is between, by way of example only, 2° C. and 5° C. Thus, the Packing Temperature Range for assembling the six PCM-filled panels into the cooler system, and for inserting the exemplary vaccine Product into the cooler system for shipment, is between 2° C. and 5° C.

As discussed above, the use of PCM as a part of the cooler system enables the cooler system to better maintain a constant temperature environment inside the assembled cooler system for an extended period of time, thereby better protecting the Product being shipped inside the assembled cooler system from exposure to harmful temperatures. There are a couple of challenges, however, associated with the use of PCM-filled panels in the cooler system as it pertains to determining when the PCM-filled panels have reached their Packing Temperature Range. By way of example only, one such problem is that the user who is shipping the temperature sensitive product (such as vaccine) typically employs an electronic infra-red temperature sensing device (the "IR gun") to scan the surface of the PCM-filled panel so as to obtain the surface temperature of the PCM-filled panel.

Not surprisingly, there are several problems associated with using an IR gun to determine the surface temperature of the PCM-filled panels. First, the surface temperature is impacted by the temperature of the ambient air touching the PCM-filled panel, and therefore the IR gun more closely reports the temperature of the room where the PCM-filled panel is thawing in conjunction with the temperature of the PCM, rather than reporting the temperature of the core of the PCM-filled panel. Second, the PCM inside a PCM-filled panel will begin melting at the surface of the PCM that touches the interior side of the PCM-filled panel, and then the melting of the PCM will move toward the interior of the PCM-filled panel. The problem this melting feature creates as it pertains to the packing of the cooler system, is that the very thin layer of melted PCM that touches the interior of the PCM-filled panel might be within the targeted Packing Temperature Range of between 2° C. and 5° C., but the majority of the PCM inside the PCM-filled panel can still be at a much colder temperature (such as anywhere between −20° C. to 0° C.). Essentially, the IR gun is unable to measure the core temperature of the PCM-filled panel.

This pertains to another problem associated with the use of PCM-filled panels, specifically that the PCM-filled panel may not be completely filled with PCM. In such a situation, if the PCM-filled panel is frozen horizontally with Side A up, the "dead air" or "head space" will be collected at the top of Side A in the interior of the PCM-filled panel. Similarly, if the PCM-filled panel is defrosted with Side A up, the air in the dead space will reach the warmer targeted packing temperature (for example, 3° C.) faster than the rest of the PCM in the PCM-filled panel. Consequently, when the person packing the cooler system uses the IR gun to determine the temperature of the PCM-filled panel, that IR gun will mistakenly determine that the PCM-filled panel is within the Packing Temperature Range, when it is in fact much colder.

Alternatively, if the panel is frozen with Side A up but is then defrosted with Side A facing down (i.e., with Side B facing up), the PCM will be touching the interior wall of Side B of the PCM-filled panel. Because this inside wall of Side B will cause the PCM touching it to melt faster than the PCM at the interior of the PCM-filled panel, when the user employs the IR gun to determine the temperature of the PCM-filled panels, she will still reach an inaccurate reading of the temperature of those PCM-filled panels as described above.

These issues associated with the use of the IR gun to determine the true temperature of a thawing PCM-filled panel results in the following problematic situation: i) if the cooler system is assembled at the point in time when the surface of the PCM-filled panels is registering between 2° C. and 5° C.; ii) but the interior of the PCM-filled panels is actually −4° C.; iii) the assembly of the six PCM-filled panels into a cooler system will result in the thermal energy of those PCM-filled panels super-cooling the interior of the cooler system down to about −4° C. (the "Super Cooling Effect"). The consequence of the Super Cooling Effect is that the temperature sensitive product being shipped inside the cooler system (such as vaccine) will be exposed to that −4° C. temperature, causing the Product to freeze (and most likely be rendered ineffective). Thus, there is a need for an Indicator that can better determine the actual temperature of the PCM-filled panel(s), and more particularly can better determine the actual temperature of the interior of the PCM-filled panel(s), and thereby avoid the problems associated with assembling a cooler system containing the six PCM-filled panels at an improper temperature (e.g., prevent the PCM-filled panels from super-freezing (or as explained herein, prevent the problems associated with "super-thawing") the Product being shipped or stored).

A problem with the prior art Indicator strip is that the currently available thermochromic liquid crystal formulations provide a very quick response to the temperature to which the prior art Indicator strip is exposed. Although such a fast-response device may work well when monitoring certain Objects in certain situations, in other instances this quick response time is actually detrimental. For example, when the prior art Indicator is used to monitor the temperature of PCM-filled panels, the formulation of the prior art thermochromic liquid crystal is too sensitive to the influences of ambient temperatures.

More specifically, as shown in FIG. 1A, FIG. 1B and FIG. 1C, the prior art Indicator strips are typically placed on a side of the Object being monitored (which in this instance is a PCM-filled panel 100). Because the prior art Indicator 120 is typically placed on the same side of the Object 100 that is impacted by the ambient air circulating around the Object 100 (and by default impacting the prior art Indicator 120 strip), and because the temperature of the ambient air is very different from the temperature of both the prior art Indicator strip 120 and the Object 100, the temperature reading of the prior art Indicator 120 strip is negatively impacted by that ambient air, because the ambient air negatively effects the accuracy of the prior art Indicator strip 120.

For example, if a PCM-filled panel 100 that had a prior art Indicator strip 120 attached to its top surface 105, was defrosting on a lab table from its pretreatment temperature of −20° C., and the room temperature was at 21° C., that panel would slowly warm to its Packing Temperature Range of 2° C. to 5° C. in about twenty minutes. However, if a fan was nearby the lab table and was moving air across the PCM-filled panel 100 and the prior art Indicator 120, the fan would cause the prior art Indicator strip 120 to indicate a colder temperature than the actual temperature of the PCM-filled panel 100. This combination of the multiple temperatures (the core temperature of the PCM-filled pane 100, the temperature of the ambient air, and the temperature of the air moving across the prior art Indicator strip 120, will cause the prior art Indicator strip 120 to display an inaccurate temperature indication to the user that is monitoring the temperature of the PCM-filled panel 100, because the prior art Indicator strip will likely indicate that the temperature of the Object 100 is colder than it actually is (but the indication could be warmer that it actually is depending on the temperature of the ambient air). Other instances of ambient temperature negatively impacting the operation of the prior art Indicator can arise simply from a person walking past the thawing PCM-filled panel 100 to which the Indicator strip 120 is attached; or from a person touching the prior art Indicator strip 120 (and thereby imprinting the person's thermal signature onto the prior art Indicator strip 120).

All these examples of ambient temperature negatively impacting the operation of the prior art Indicator all lead to the same result as described above—an inaccurate temperature indication generated by the prior art Indicator, which leads to the user assembling the cooler system too soon, and super-cooling the temperature sensitive product (such as vaccine) being shipped. Thus, there is a need for an improved Indicator with a housing that better insulates the Indicator strip from the negative ambient influences arising from airflow and physical touching.

Another problem with the prior art Indicators is that the operation of the device is dependent on the speed at which the thermochromic liquid crystals contained inside the Indicator "operate". Specifically, thermochromic liquid crystals operate by changing color in response to changes in the temperature impacting the thermochromic liquid crystals. This response (i.e., the color change) occurs because the spacing between the thermochromic liquid crystal molecules changes therefore changing the wavelength of the light reflected to the observer.

The problem associated with the operation of the thermochromic liquid crystal as it pertains to its responsiveness to temperature is that the thermochromic liquid crystals are "too responsive" to the temperatures to which they are exposed. For example, if a slight breeze is created by a nearby fan, or is created by someone walking past the prior art Indicator, and that breeze is a temperature different than that of the Object to which the prior art Indicator is attached and is monitoring the temperature of, that breeze results in the prior art Indicator improperly indicating a temperature that is different than the one that should be indicated (i.e., the temperature of the Object being monitored by the prior art Indicator).

The responsiveness or speed at which the color of the prior art Indicator strip changes, is directly correlated to the speed at which the thermochromic liquid crystals change their orientation in response to a change in temperature. This change in orientation is simply a function of the way in which the thermochromic liquid crystals operate. Unfortunately, that quick responsiveness leads to the Indicator indicating a temperature different from the temperature of the Object being monitored; which could lead to the user assembling the cooler system at the wrong point in time (and ultimately super-cooling or super-thawing the temperature sensitive product being shipped in the cooler system). Thus, there is a need for an Indicator strip containing a thermochromic liquid crystal formulation that includes a component that slows down the responsiveness of the thermochromic liquid crystals reacting to a change in temperature.

Another problem with the prior art Indicators is that the liquid crystal formulations employed in the operation of the prior art Indicator have a wide range of operation when compared to its color change. For example, assuming a thermochromic liquid crystal is formulated to begin changing color (has a "Red Start") at 2° C. and complete its color change at 11° C., the following should occur. First, when the thermochromic liquid crystal contained in the prior art Indicator is below 0° C., the prior art Indicator strip will appear black (assuming the color of the backing layer facing the user is colored black) because no color is being reflected off the thermochromic liquid crystal to the user.

Depending on the formulation of the thermochromic liquid crystal inside the prior art Indicator, as the liquid crystal warms to about 2.0° C., the liquid crystal reaches its Red Start and will turn a reddish color. Then as the temperature of the thermochromic liquid crystal inside the prior art Indicator strip continues to warm, and approaches about 3.0° C., the thermochromic liquid crystals continue to change their spacing and start to reflect a green color to the user. Thus, the "Color Range" of the red color in this example is about one degree Celsius (i.e., from about 2.0° C. to about 3.0° C. but it could reach 3.5° C.). Then as the thermochromic liquid crystals continue to warm and change their orientation, at about 4.0° C. they start to reflect a blue color to the user. Thus, the Color Range of the green color in this example is about one degree Celsius (i.e., from about 3.0° C. to about 4.0° C., but it start at 3.5° C. and could reach 4.5° C. or even 5.0° C.). One of ordinary skill in the art will recognize that the combination of the Color Range for the red color plus the Color Range for the green color is known as the "Color Play" or "Width". It is also understood by one of ordinary skill in the art that the thermochromic liquid crystal formulation can be formulated so that the Color Range for red color can either be equal to, or not be equal to, the Color Range of the green color.

Similarly, as the thermochromic liquid crystals continue to warm and change their orientation, at about 7.5° C. they start to reflect a purple color to the user. Thus, the Color Range of the blue color in this example is about three and one-half degrees Celsius (i.e., from about 4.0° C. to about 7.5° C., but could start at about 5.0° C. and last until about 8.5° C.). Finally, as the thermochromic liquid crystals continue to warm and change their orientation, at about 11.0° C. they start to reflect no color to the user (because at that point the user is viewing the back layer of the strip). Thus, the Color Range of the purple color in this example is about three and one-half degrees Celsius (i.e., from about 7.5° C. to about 11.0° C., but it might not start until 8.5° C. and last until about 12.0° C.). The combination of all the Color Ranges (i.e., the about 1 degree Celsius for red+the about 1 degree Celsius for green+the 3.5 degrees Celsius for blue+ the about 3.5 degrees Celsius for purple) equals a "Color Display Range" of nine degrees Celsius.

The Color Range of the blue color can be much longer than either the Color Range of the red color or the green color (partially because the early blue color will still contain some green color). In fact, the Color Range of blue might be three or more times as long as the Color Range for either the red color or the green color reflected by the thermochromic liquid crystals to the user. The same can be true for the Color Range for the purple color as it corresponds to the Color Range of the red color and/or the green color. It is not uncommon for one of ordinary skill in the art to not even refer to the purple color reflected by the thermochromic liquid crystals, and instead when one of ordinary skill in the art refers to a blue color, she or he will be referring to the combination of the blue color and the purple color. However, because the inventions described herein pertain to colors and shades of color, this application will occasionally distinguish between the blue and purple colors reflected by the thermochromic liquid crystals to the user of the prior art Indicator strips.

The problem with the prior art Indicator strips is that the color visible at the higher end of the thermochromic liquid crystals' Color Display Range, which is the blue Temperature Range and/or the purple Color Range, persists for longer than the proportional range of the lower temperatures (e.g., the Color Range for a red color and/or the Color Range for a green color), especially given the long blue Color Range as it slowly changes from a green color, and slowly changes to a purple color, before all color reflection ends. By way of example only, if thermochromic liquid crystal is formulated so that the Color Play for the red color and the green color equals two degrees Celsius (i.e., one degree Celsius for red, plus one degree Celsius for green), when that prior art Indicator strip moves from green to blue, the Color Range for the blue color will last for at least three and one-half degrees Celsius or more. Moreover, the Color Range for the purple color that follows the blue color will also last for at least three and one-half degrees Celsius or more.

In certain applications, these long lasting Color Ranges for the blue and purple colors may be so confusing to the user that the Indicator is of no use because the Color Display Range of that Indicator is too wide for a given use. By way of example only, if the Indicator is needed to indicate a Color Display Range that is just three degrees Celsius wide (by way of example only, the three degrees Celsius range of the Packing Temperature Range for vaccine), such an Indicator would be impossible to manufacture with the current technology because although the Color Play of the red color and the green color would equal about two degrees Celsius, because of the operation of the thermochromic liquid crystal, the Color Range of the blue and purple colors would last at least three and one-half degrees Celsius each. Consequently, the Color Display Range for that Indicator would be at least nine degrees Celsius (e.g., (about one degree Celsius Color Range for red)+(about one degree Celsius Color Range for green)+(about three and one-half degrees Celsius Color Range for blue)+(about three and one-half degrees Celsius Color Range for purple)=a Color Display Range of nine degrees Celsius)) rather than the desired Color Display Range of three degrees Celsius.

These long persisting blue and purple Color Ranges are problematic for at least two reasons. First, thermochromic liquid crystals can only be formulated for a temperature resolution of about 0.5° C. Thus the narrowest a Color Range for a red or green color can be is point-five degrees Celsius. And thus the Color Range for its corresponding blue and purple colors would be about three-point-five times the Color Range of red or green, or a Color Range of one-point-five degrees Celsius for blue and a Color Range of one-point-five degrees Celsius for purple. (Thus, it may be impossible to manufacture an Indicator that possesses a Color Display Range of only two degrees Celsius, because the red Color Range plus the green Color Range would require a combined total of one-point-zero degree Celsius, and the blue Color Range and the purple Color Range would require one-point-five degree Celsius each; which equals a Color Display Range of four-point-zero degrees Celsius (e.g., (one-half degree Celsius for red)+(one-half degree Celsius for green)+(one and one-half degrees Celsius for blue)+(one and one-half degrees Celsius for purple)=a total of four degrees Celsius)) rather than the desired two degrees Celsius Color Display Range. Thus, there is a need for an Indicator that is able to at least partially block (or possibly completely block) a given color's Color Range from being reflected to the user of the Indicator so as to obtain an Indicator with a reduced Color Display Range.

It should be appreciated that this long Color Range associated with the blue color, and the long Color Range associated with the purple color creates another problem for the use of the prior art Indicator in conjunction with the PCM-filled panels (as well as for other applications). Specifically, because of the long Color Range of the blue color and the long Color Range of the purple color, the user could be misled into thinking that the PCM-filled panels were within the desired Packing Temperature Range (by way of example only, 2° C. to 5° C.) because a color indication (in the form of a blue color or purple color) was still visible in the Indicator. But in fact, because the corresponding temperature of that blue color was 6° C. or 7° C. (and thus, outside the desired Packing Temperature Range) the temperature of the PCM material in the panel had already thawed and warmed to such a point that there was not enough thermal energy left in each panel to protect the Product being shipped in the cooler system.

For example, if the prior art Indicator was showing a purple color, the user responsible for packing and shipping the temperature sensitive product might understand that purple color to mean that the PCM-filled panels were within the proper Packing Temperature Range for assembly and shipment. In reality, the purple color is an indication that the PCM had already melted to the point where the temperature of the PCM was 7° C. or higher. At that point, the cooling system containing the assembled six PCM-filled panels would not have enough cooling energy left in the panels to protect the temperature sensitive product being shipped in the cooling system from prolonged exposure to hot temperatures (known as "Super Thawing"). Consequently, that temperature sensitive product would be rendered ineffective by an exposure to an excursion to a warm temperature. Thus, there is a need for an Indicator that possesses a way for the Color Display Range displayed to the user to be narrowed.

This inability of the prior art Indicators to indicate temperatures in a narrow Color Display Range (by way of example only 3.0° C. or less) results in the next problem associated with these prior art Indicators, which is that in order to accurately indicate an Object was within a desired Color Display Range of just 3.0° C., the user must: i) employ an Indicator with at least two distinct sections that each provide its own color indication (i.e., the "Display Panels"); ii) each Display Panel must contain its own distinct thermochromic liquid crystal formulation; and iii) the user must compare the color of a first Display Panel to the color of a second Display Panel, and make a cognitive decision regarding the supposed temperature of the Object based on the differing colors displayed by the two formulations in their respective Display Panels. As will be explained below, this prior art Indicator can be very confusing for the user.

Referring to FIG. 1C and FIG. 1D, the prior art Indicator strip 120 requires the use of a first collection of thermochromic liquid crystals 125 contained in a first display panel 126 having its own formulation, so as to provide a color change at a first temperature, and requires the use of a second collection of thermochromic liquid crystals 125 in a second display panel 127 also having its own formulation different from that of the thermochromic liquid crystal 125 contained in the first display panel 126, so as to provide a notable color difference between the first display panel 126 and the second display panel 127. The liquid crystal formulations in each of the first panel 125 and the second panel 126 differ in their Red Start temperature. In the prior art Indicator strip 120, the Red Start temperature for the liquid crystal formulation in the first display panel 126 is lower than the Red Start temperature of the liquid crystal formulation in the second display panel 127. The difference between the Red Start temperature for the thermochromic liquid crystals in the first display panel 126 and the thermochromic liquid crystals in the second display panel 127 is by way of example only about two to three degrees Celsius.

The prior art Indicator strip 120 in FIG. 1D also includes small orientation squares 129 that are colored a certain color so as to contrast with the color of the first display panel 126 and the color of the second display panel 127. The template 128 is used to visually separate the first display panel 126 from the second display panel 127 of the Prior Art Indicator strip 120 in their activated state. The orientation squares 129 are located on top of the prior art Indicator strip 120 and are used by the end user to verify the orientation of the prior art Indicator strip 120, because without the orientation squares, the user would likely not know which of the display panels 125 and 126 would be formulated to be the first Red Start color change.

As described herein, thermochromic liquid crystals can reflect different colors as they are heated or cooled. Below the Red Start temperature, a liquid crystal strip will appear black due to the backing layer being colored black. However, as the Indicator strip is heated above the Red Start temperature, the film will first appear red, then green, then blue, and then purple until finally the Indicator strip becomes black again. Given that the prior art Indicator 120 strip in FIG. 1D contains a first display panel 126 and a second display panel 127, and each display panel can display several colors (black, red, green, blue and purple), there are several possible color combinations that can be displayed by the prior art Indicator 120 depending on the temperature the prior art Indicator strip 120 is exposed to.

As described herein, the prior art Indicator strip 120 can be attached to an Object so as to be used to determine the temperature of that Object. When the Object to which the prior art Indicator strip 120 is attached is colder than the Red Start temperature of the liquid crystal formulations 125 contained in both the first display panel 126 and second display panel 127 of the prior art Indicator strip 120, both display panels 126 and 127 will appear black (as shown in FIG. 1D by the hash marks). Thus, if an Object were thawing from a freezing temperature to a warmer temperature, the black color of the display panels 126 and 127 would indicate to a user that the Object is at a temperature that is lower than the Red Start temperature of the liquid crystal formulations in the first display panel 126 and second display panel 127 and thus is not within the Packing Temperature Range. Note that the color of the template 128 (that provides shape and detail to the prior art Indicator) is also black; and therefore, when the temperature of the Object is colder than the Red Start temperatures of the first display panel 126 and the second display panel 127, no contrast is evident.

The Red Start temperature of the liquid crystal 125 formulation in the first display panel 126 coincides with a temperature of interest to the end user. The Red Start temperature of the liquid crystal 125 formulation in the second display panel 127 coincides with a second temperature of interest to the end user. In general, the end user is interested in determining whether the temperature of the Object 100 is supposedly within the Packing Temperature Range, which would be between the Red Start temperatures of the first display panel 126 and the second display panel 127.

The prior art Indicator strip 120 is designed in such a way that when it is attached to an Object that has been frozen, several color combinations are observed when the Object thaws to a warmer temperature. For instance, as the temperature of the thawing Object rises beyond the start-of-indication temperature of the first display panel 126 but is still lower than the start-of-indication temperature of the second display panel 127, several color combinations are possible as shown in FIG. 1E. The first combination to appear as the temperature rises is shown by the prior art indicator strip 130 in FIG. 1Ea, which shows the first display panel 136 appearing red (as denoted by the dots) and the second display panel 137 appearing black (as indicated by the hash marks). Note that the color of the template 138 is black and therefore good contrast is evident between the red color of the first display panel 136 and the template 138.

The second combination to appear as the temperature rises is shown by the prior art Indicator 140 depicted in FIG. 1E, which shows the first display panel 146 appearing green (as denoted by the unfilled circles) and the second display panel 147 appearing dark (as indicated by the hash marks). Note that the color of the template 148 is black and therefore good contrast is evident between the green color of the first display panel 146 and the template 148.

The third combination to appear as the temperature of the Object rises is shown by the prior art Indicator 150 in FIG. 1Ec which shows the first display panel 156 appearing blue (as denoted by the diamond-shaped marks) and the second display panel 157 appearing black (as indicated by the hash marks); which supposedly indicates that the Object is within the desired Packing Temperature Range. Note that the color of the template 158 is black and therefore good contrast is evident between the blue color of the first display panel 156 and the template 158.

The three color combinations displayed collectively in FIG. 1Ea through and including FIG. 1Ec show that the temperature of the Object is within the Packing Temperature Range and is demarcated by the Red Start temperatures of the first display panel 136, 146 and 156, when compared to the color of the second display panel 137, 147 and 157, respectively. As such, the PCM-filled panels or Objects could be at the proper temperature for assembling the cooler system and shipping the temperature sensitive product, supposedly without concern that: i) the assembled cooler system would Super Cool the temperature sensitive product being shipped; or ii) the assembled cooler would lack enough thermal energy to protect the Product being shipped against Super Thawing.

Although the operation of the prior art Indicator as described collectively in FIG. 1Ea through and including FIG. 1Ec is initially desirable because it appears that only a single display panel 136, 146 and 156 would be needed to alert the user that the temperature of the Object was within the Temperature Packing Range, as described above, the Color Display Range over which liquid crystal films effectuate their change of Color Range from black to red, green, blue, purple and black again is so wide, it requires at least two display panels 126 and 127 to be used. This shortcoming of thermochromic liquid crystal becomes obvious when the user desires to monitor the temperature over a Color Display Range that is a very short (by way of example only, a Color Display Range of three degrees Celsius). Therefore, if an Indicator of the type described in FIG. 1Ea through and including FIG. 1Ec is desired that has a Packing Temperature Range of three degrees Celsius, because of the long persistence of the blue and purple colors through their Color Range, the prior art Indicator 130 requires the use of the at least two panels to allow the user to discern whether the temperature of the Object was still within the Packing Temperature Range.

This is why, as shown in FIG. 1Ec, when the Object to which the Indicator is attached is thawing, a color combination is possible in which the first display panel 156 turns blue and/or purple while the second display panel 157 remains black or dark.

However, due to the persistence of the blue and purple colors over a wide temperature range, the start-of-indication temperature of the second formulation of the liquid crystal 125 included in the second display panel 157 is set to coincide with the highest temperature in the temperature range of interest to the user. Therefore, as the temperature of the thawing Object continues to rise, several other color combinations are possible as shown by FIG. 1F so as to warn the user that the temperature of the Object (e.g., the PCM-filled panel) had exceeded the Packing Temperature Range.

For instance, the first color combination encountered as the temperature rises beyond the Packing Temperature Range and causes the Red Start temperature of the second display panel 167 to be visible, is shown by the prior art Indicator 160 in FIG. 1Fa, which shows the first display panel 166 showing a blue color (as indicated by the diamond-shaped marks) and the second display panel 167 showing a red color (as shown by the dots). Note that the second display panel 167 also contains the message "NO!" to advise the user that even though a color is observed in the first display panel 166 and in the second display panel 167, the temperature of the Object being monitored is higher than the Packing Temperature Range. Because the color of the "NO!" message is black, it blends in with the black color of the second display panel when it has not yet reached a temperature that causes the thermochromic liquid crystals to reflect a color (as shown in 137, 147 and 157), and therefore the user cannot view that NO! message until the liquid crystal 125 contained in the second panel 137 or 167 reaches its Red Start temperature. Note that the color of the template 168 is also black, and therefore as shown in FIG. 1Fa, good contrast is evident between the blue color of the first display panel 166, the red color of the second display panel 167 and the black color of the template 168.

The second color combination encountered by the user as the temperature of the Object rises above a desirable Packing Temperature Range, is shown by the prior art Indicator 170 in FIG. 1Fb, which shows the first panel 176 showing a black color (as indicated by the hash marks) and the second display panel 177 showing a green color (as shown by the unfilled circles). Note that the second display panel 177 contains the message "NO!" to advise the user that even though a color is observed in the prior art Indicator 170, the temperature is higher than the Packing Temperature Range. Note that the color of the mask 178 is black and therefore good contrast is evident between the green color of the second display panel 177 and the template 178.

The third color combination encountered as the temperature rises beyond the desirable Packing Temperature Range, which is evidence by the Red Start of the second display panel 187 being visible, is shown by the prior art Indicator 180 in FIG. 1Fc, which shows the first display panel 186 showing a black color (as indicated by the hash marks) and the second display panel 187 showing a blue or purple color (as shown by the diamond-shaped marks). Note that the second display panel 187 contains the message "NO!" to advise the user that even though a color is observed, the temperature of the Object being monitored is higher than the temperature range of interest. Note that the color of the template 188 is black and therefore good contrast is evident between the blue color of the second display panel 187 and the template 188.

A reprint of the user instructions for the interpretation of the two panel prior art Indicator 120, 130, 140, 150, 160, 170 and 180 is shown in FIG. 1G, along with the instructions to possibly understand its operation.

What should be appreciated by the fact it took multiple paragraphs to describe how prior art Indicators 120, 130, 140, 150, 160, 170 and 180 function, is that the device is very cumbersome and difficult to use when determining whether or not the temperature of the Object is within the Packing Temperature Range, as evidenced by the confusing user instructions at FIG. 1G. Moreover, because a first display panel 136 and a second display panel 137 are necessary in order for the user to be able to discern whether or not the Object is within the Packing Temperature Range, by default at least a first formulation and a second formulation are required for the first display panel 136 and the second display panel 137, respectively, to convey the confusing message to the user (i.e., the Object was or was not within the desired Packing Temperature Range).

It should also be appreciated that each formulation in each of the two display panels 136 and 137 has a cost associated with manufacturing the formulation, applying the formulation to the cardboard, etc. Thus, by way of example only, it is desirable that an Indicator for certain embodiments have just a single display panel so as to: i) eliminate the need to perform the cognitive steps associated with the use of multiple display panels so as to determine when the Object is within its Packing Temperature Range; ii) eliminate the need for orientation boxes so as to be able to determine which is the first display panel and which is the second display panel; iii). eliminate the confusion associated with the use of multiple display panels; and iv) reduce the cost associated with use of multiple display panels.

It should also be appreciated that there are other prior art Indicators that employ not just two, but three display panels in order to display to the user whether the Object being monitored is within the Packing Temperature Range. In very simple terms and as shown in FIG. 1H, the three display panel prior art Indicator 190 has a first panel 196 containing an "X" to indicate, when it is visible, that the temperature of the Object to which the three display panel prior art Indicator 190 is attached is at too low of a temperature for the cooling system to be assembled and the Product packed into the cooling system. The second display panel 197 contains a "√" to indicate, when it is visible, that the Object is at the desired temperature (i.e., the PCM-filled panel is within the Packing Temperature Range for assembly into the cooling system). And the third display panel 198 contains an "X" to indicate, when it is visible, that the temperature of the Object (likely the PCM-filled panel) is too high for the cooling system to be assembled and the Product being inserted into the assembled cooler system.

As with the two-panel prior art Indicator discussed above in regard to FIG. 1D, FIG. 1E and FIG. 1F, each of the formulations in the three display panels 196, 197 and 198 are designed to interact with each other, so as to provide a message to the user as to whether or not the Object was within its Packing Temperature Range. Thus, the three-panel prior art Indicator 190 has the same problems as the two-panel Indicator. By way of example only, one problem with the three panel prior art Indicator 190 is the fact that it contains three display panels 196, 197 and 198, and each display panel contains a separate liquid crystal formulation which has all the problems discussed herein. Moreover, the user of the three panel prior art Indicator 190 must perform cognitive thinking and comparisons of the glyphs 199 displayed in the three display panels 196, 197 and 198 to properly determine whether the Object whose temperature is being monitored (e.g., a PCM-filled panel) is at the proper temperature for assembly into the cooling system (i.e., within the Packing Temperature Range). Thus, it would be advantageous to have a thermochromic liquid crystal Indicator that contains a single display panel, because such an Indicator would be easier for the user to employ, and would be less expensive to manufacture.

BRIEF SUMMARY OF INVENTION

Embodiments of the present inventions include Indicator(s) described herein to, for example, achieve a more accurate indication or reflection of the temperature of the Object to which the Indicator is attached or otherwise associated with by overcoming the problems common in the use and/or operation and/or construction of the currently available prior art Indicators as discussed above.

Embodiments of the inventions can, for example, be used to indicate the temperature of the Object to which the Indicator is attached, or the temperature of the environment surrounding the Object, and in doing so more accurately reflect to the person interested in the temperature of the Object, what the actual temperature of that Object is and/or temperatures the Object has been subjected to. That Object could be by way of example only a device, a product, an insulating device, a person, and/or an article.

Embodiments of the inventions described herein can achieve this more accurate indication or reflection of the temperature of the Object to which the Indicator is attached in at least the ways described herein, and do so either individually or collectively.

Embodiments of the inventions described herein can achieve more accurate indication or reflection of the temperature of the Object attached to the Indicator or within an Object on which the Indicator is located while overcoming the problems common in the use and/or operation and/or construction of the currently available Indicators.

The present inventions and their related embodiments can overcome problems in the prior art by, for example, employing a novel Indicator that eliminates the effects of ambient air and/or the touching of the Indicator. The improvements presented by the inventive device arises from various novel aspects, including one or more of the following: 1) the structure of the inventive device (which could include by way of example only, one or more of the following aspects: i) including a top capsule for forming an air pocket; ii) a magnifying optic or a magnifying film for increasing the visual size of the glyph being displayed by the liquid crystal either alone or in conjunction with a type of template or mask; and iii) an optic or optic film for increasing the viewing angle of the message displayed by the liquid crystal layer); 2) a thermo-insulative layer positioned on top of the liquid crystal layer and a thermal transmitting layer positioned below the liquid crystal layer; 3) the positioning of the inventive devices on the Object so that the inventive devices are preferably positioned in a manner that the impact of the ambient air on the operation of the thermochromic liquid crystal is minimized, including positioning the inventive devices so that they are isolated from the air stream of the ambient air surrounding the Object, as well as preferably positioning the inventive device so that it is closer to and can better reflect the core temperature of the Object; 4) a template to display a message to the user, the template comprised of at least two regions, one region being fully and solidly colored and the other region being completely clear, wherein the template displays a message alternately when the colors reflected by the liquid crystal layer to the user through the transparent region of the template blend in with the colored region of the template at a first temperature, and the color of the template contrasting with certain other colors reflected by the liquid crystal layer to the user through the transparent portion of the template at a second temperature; and 5) a mask that acts as a filter to block certain colors from being reflected by the liquid crystal layer to the user at a first temperature and allows certain other colors to pass through and be viewed by that user at a second temperature and that differs from the template in that the mask is not solidly colored.

By isolating the inventive Indicator from the impact of the ambient air surrounding both the Indicator and the Object, the inventive Indicator provides an indication of temperature that is more closely aligned with the temperature of the Object, and more particularly is more closely aligned with the temperature of the core of the Object, and less reflective of the temperature of the surface of the Object being monitored.

An alternative embodiment of the present inventions could also contain an improved liquid crystal formulation that aids in slowing the responsiveness of the transition of the liquid crystals from one orientation to a second orientation in response to a change in temperature, thereby slowing down the Color Change.

Another alternative embodiment of the present inventions could contain a template that displays a message to the user by alternately blending in with certain colors reflected by the thermochromic liquid crystal layer to the user so as to cause the message to not be able to be seen by the user when the thermochromic liquid crystal is within a certain Color Range (at a first temperature), and then contrasting with certain other colors reflected by the thermochromic liquid crystal layer so as to cause the message to be able to be seen by the user due to the contrast between the color of the template and the color of the thermochromic liquid crystal when it is within a different Color Range (at a second temperature).

Another embodiment of the present inventions could contain a mask (which acts like a color filter) that aids in partially or completely blocking one or more Color Ranges from being displayed to the user, while allowing other colors to pass through the filter and be viewed by the user at a second temperature. This can be accomplished by selecting the coloring of the top layer of the liquid crystal strip so as to create a mask that is used to display a glyph or message to the user that indicates that the Object is within the Packing Temperature Range (e.g., by displaying a Color Range, displaying a glyph, or otherwise informing the user that the product being monitored by the Object is ready or is not ready for use), and such can be displayed because of either: i) the color or colors reflected off the thermochromic liquid crystal being allowed to pass through a single portion mask at a first predetermined temperature, but then blocking other colors at a second predetermined temperature; or ii) the contrast created between a first color or colors reflected off the thermochromic liquid crystal and being allowed to pass through a first portion mask while that first portion of the mask simultaneously blocks or filters other colors, and a second color or colors reflected off the thermochromic liquid crystal and being allowed to pass through a second portion of the mask at the same predetermined temperature while that second portion of the mask also simultaneously blocks or filters other colors.

More specifically, the colors displayed to the user by the Indicator could be narrowed, thereby causing a narrowing of the Color Display Range displayed to the user, by employing a template or a mask that blocks, absorbs, filters or cancels out a particular color being reflected by the thermochromic liquid crystal to the user. This blocking, absorption, filtering or cancelling out of the selected Color Range so as to reduce the width of the Color Display Range could occur on either end of the temperature range displayed. Such blocking, absorption, filtering or cancelling out can result in the user not seeing the Color Range being filtered out. For example, if the Indicator changes color when it warms from red to green, and then changes color from green to blue, and then blue to purple, if the blue and purple colors are unfavored, by coloring a mask a certain color, that certain color will absorb most of the blue color and most of the purple color so that most of the blue color (typically the blue hues appearing at the end of the blue Color Range) and most of the purple color are not displayed to the user of the Indicator and instead a black color is displayed. The certain color used in the mask also has the advantage of allowing most of the red and green colors to pass through so that the user can view those colors.

Eliminating a first color from being displayed to the user also has the advantage of allowing the Color Range of a second color to be displayed to the user for a longer period of time because the formulation of the liquid crystal would be formulated to allow the second color to occur in the same temperature that the first color occurred in. For example, if an Indicator has a green color that is visible from 12° C. to 14° C., and a blue color that is visible from 15° C. to 21° C. so that the green Color Range is two degrees Celsius long, and the blue Color Range is six degrees Celsius long, if the blue Color Range is filtered out, the thermochromic liquid crystal could be formulated so that the green color is visible at not only 12° C. to 14° C., but at 15° C. to 21° C. as well, and then most of the blue color that would have a Blue Start at about 22° C. is filtered out. This is desirable because a green color would be much easier for a user to understand as signaling the Object being monitored is at the desired temperature.

An additional alternative embodiment of the present inventions could contain an Indicator that employs a single display panel, so as to eliminate the cost of generating and using multiple formulations of liquid crystal. Doing so would also eliminate the confusion associated with the use of the prior art Indicators containing two or more display panels.

DETAILED DESCRIPTION OF THE PREFERRED EMBODIMENTS

It should be noted that the present inventions disclosed herein, along with their various embodiments, pertain to the art of temperature sensitive liquid crystals, their inclusion in a novel Indicator, and the various embodiments of those Indicators. Although the temperature sensitive liquid crystals include a large class of chemicals, including by way of example only thermochromic liquid crystals, thermotropic liquid crystals, cholesteric liquid crystals and cholesteric nematic liquid crystals, for the sake of convenience only, this application will focus in this detailed description on the thermochromic type of liquid crystals, although the other types of liquid crystals could be used as well.

Figure 1A:
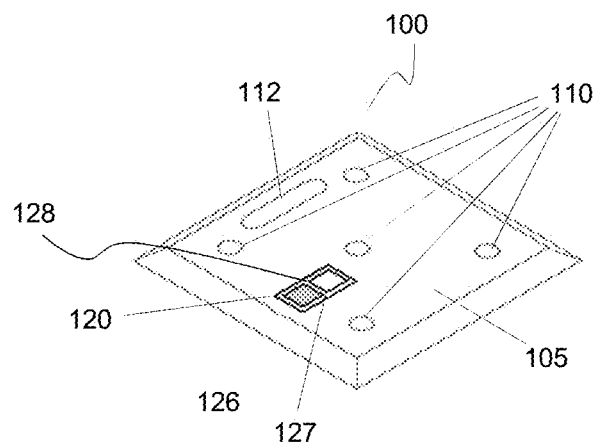
FIG. 1A is a side overhead view of a prior art PCM-filled panel with a prior art thermochromic liquid crystal strip or Indicator on its top surface.
Figure 1B:
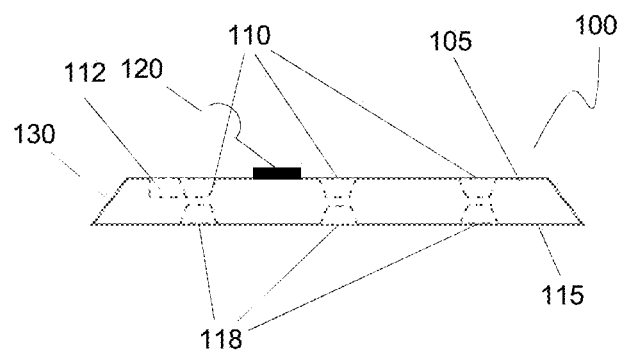
FIG. 1B is a side cross-sectional view of the prior art PCM-filled panel with a prior art thermochromic liquid crystal strip or Indicator on its top surface.

Referring initially to FIG. 1A and FIG. 1B, there is shown a prior art PCM-filled panel 100, and positioned on the top layer 105 of the PCM-filled panel 100 is a prior art thermochromic liquid crystal strip or Indicator 120. The prior art PCM-filled panel 100 may include several indentations, including top indentations 110 in the top layer 105 and bottom indentations 118 in the bottom layer 115 of the PCM-filled panel. The top layer 105 of the PCM-filled panel 100 can also contain a handhold 112 for moving the PCM-filled panels 100 in and out of the cooler box (not pictured) into which they are packed so as to allow a better fit when the PCM-filled panels 100 are assembled in the cooler, the PCM-filled panels 100 may have beveled edges 130.

Figure 1C:
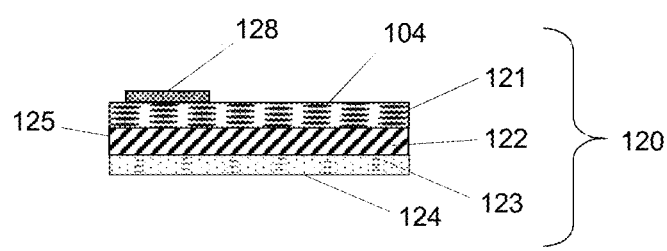
FIG. 1C is a side cross-sectional view of the prior art thermochromic liquid crystal strip or Indicator.
Figure 1D:
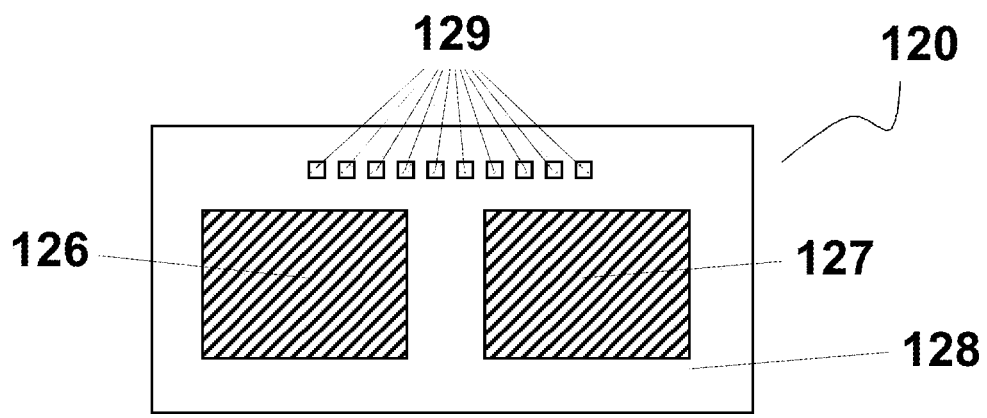
FIG. 1D is a top down view of a prior art thermochromic liquid crystal strip or Indicator.

As shown in FIG. 1C and FIG. 1D, the prior art Indicator 120 can include at least a template 128 that is positioned on the top surface 104 of the top layer 121 of the prior art Indicator 120, a top layer 121 that faces the user of the strip 120 and is typically positioned below the template 128 (although the position of the top layer 121 and the template 128 could be reversed in that the template 128 could be applied to the bottom side of the top layer 121), a bottom layer 123 that typically faces the surface of the Object being monitored, and a middle layer 122 that is formed by the top layer 121 and the bottom layer 123. This middle layer 122 is the region where the prior art thermochromic liquid crystal 125 is contained. The middle layer 122 of the thermochromic liquid crystal strip 120 could contain more than one compartment. For example, as shown in FIG. 1A and FIG. 1D and as discussed herein, there is a first compartment 126 containing a first formulation of thermochromic liquid crystal 125, and a second compartment 127 containing a second formulation of thermochromic liquid crystal 125.

An adhesive layer 124 is typically applied to the side of the bottom layer 123 facing away from the thermochromic liquid crystal 125, and is typically used to attach the thermochromic liquid crystal strip 120 to the Object. A template 128 is typically applied (typically by painting, etc.) onto at least a portion of the top surface 104 of the top layer 121 so as to allow the user to differentiate between the first compartment 126 and the second compartment 127, although the template 128 can also be described to extend across both the first compartment 126 and the second compartment 127, or to convey a message to the user (see FIG. 1F).

Figure 1E:
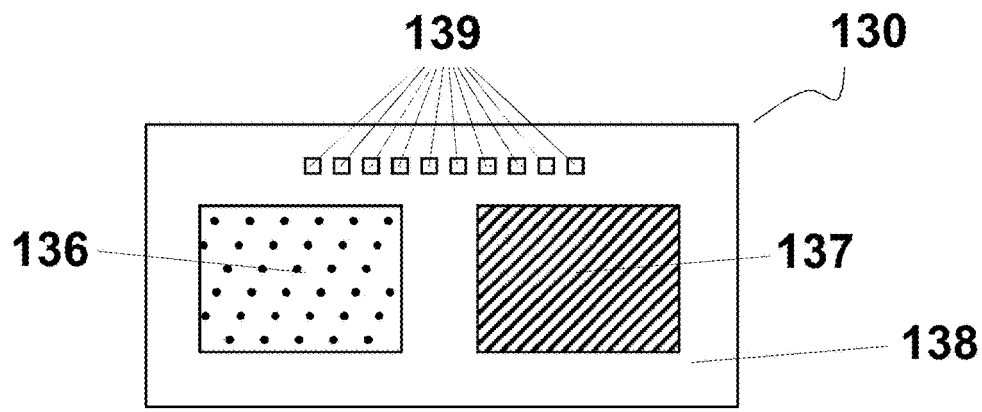
FIG. 1Ea, FIG. 1Eb, and FIG. 1Ec are top down views of prior art thermochromic liquid crystal strips or Indicators.
Figure 1E:
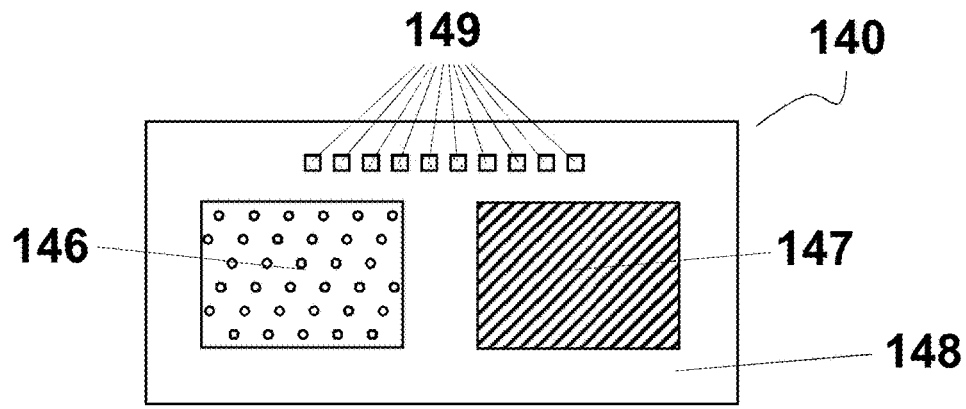
Figure 1E:
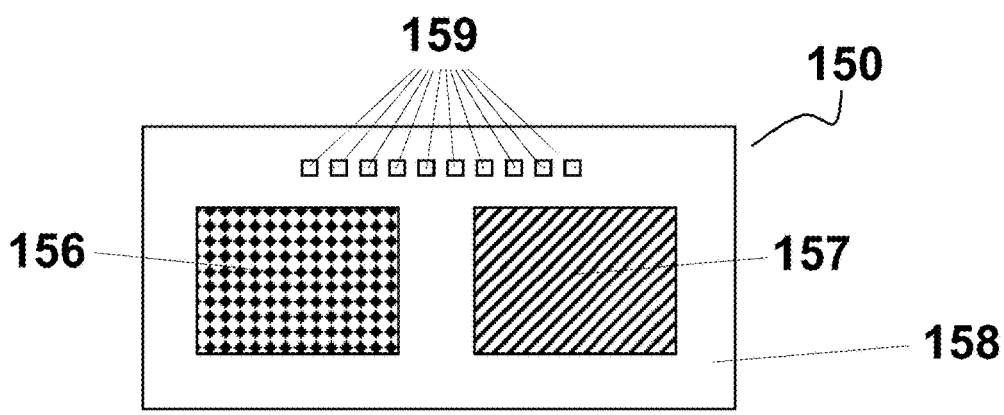
Figure 1F:
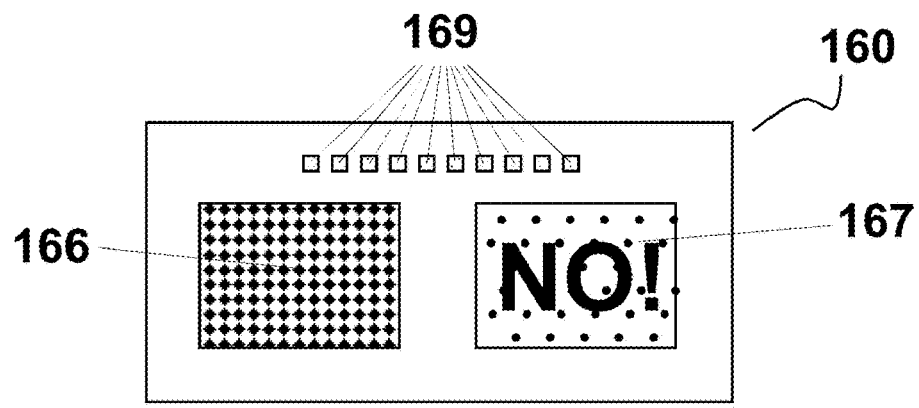
FIG. 1Fa, FIG. 1Fb and FIG. 1Fc are top down views of prior art thermochromic liquid crystal strips or Indicators.
Figure 1F:
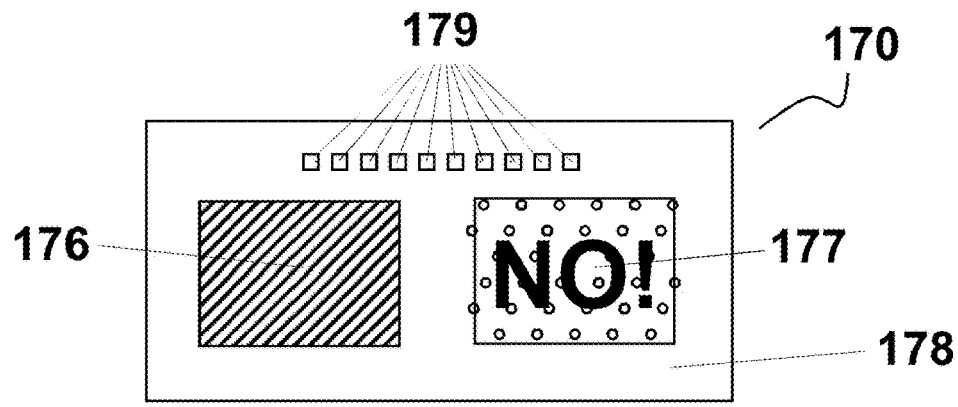
Figure 1F:
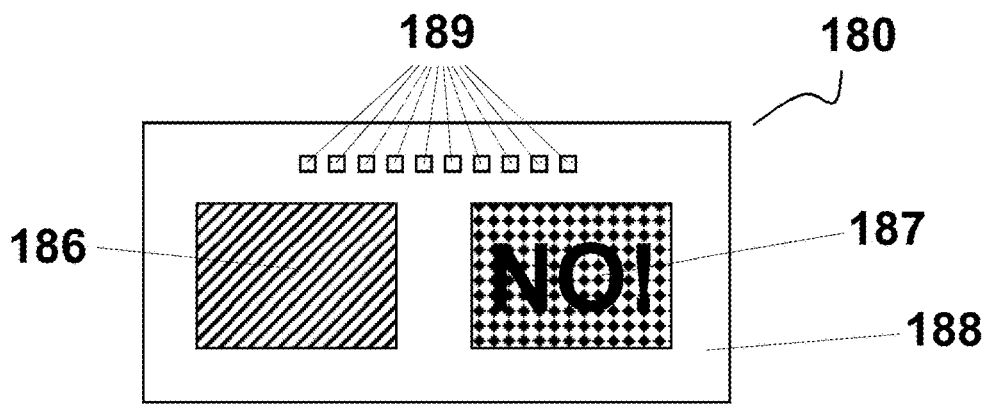
Figure 1G:
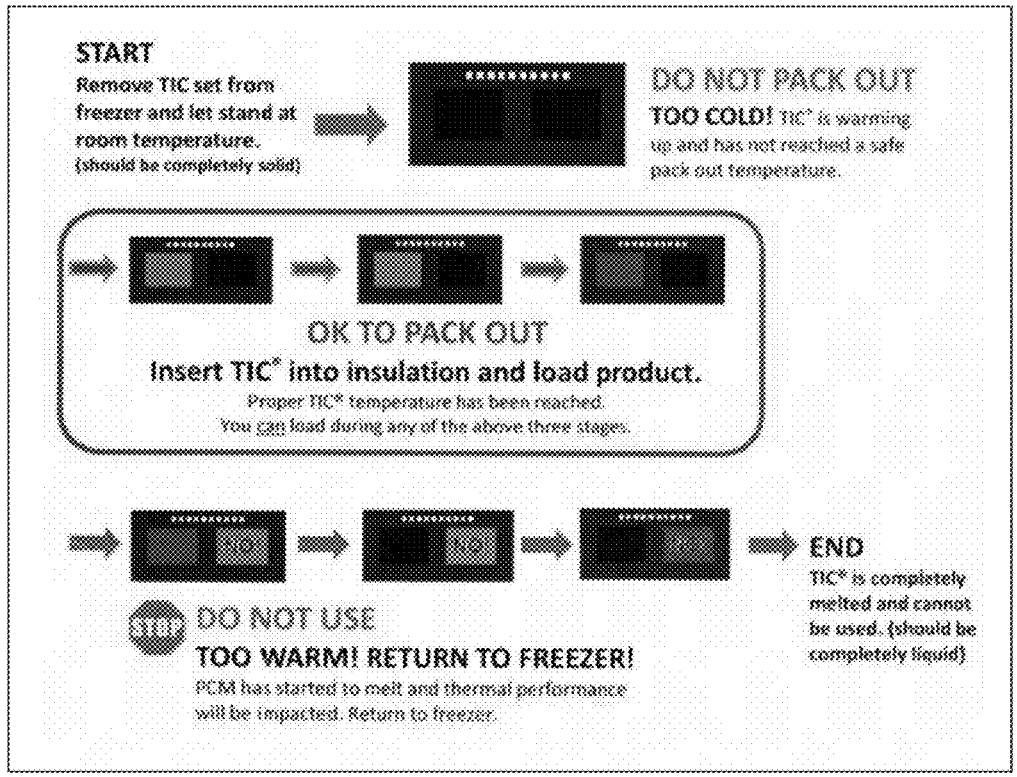
FIG. 1G is a top down view of a prior art thermochromatic liquid crystal strip or Indicator.

As discussed herein, the prior art thermochromic liquid crystal strip 120 has several problems associated with its use. More particularly, as described herein and as illustrated in FIG. 1D through FIG. 1F, as well as in regard to FIG. 1G, the prior art Indicators 120 can be confusing to use because of the multiple colors displayed that must be compared to each other and the user must make a cognitive decision so as to determine whether the Object was within its Packing Range Temperature. The fact that multiple formulations are used in each Indicator, and each formulation has an associated manufacturing cost, means that the price of prior art Indicators include the costs associated with multiple liquid crystal formulations.

The use of two formulations so as to convey the message (i.e., indicate) that the PCM-filled panel at issue had reached the proper temperature and that it could be assembled into a cooler system for use in shipping a temperature sensitive product, is not economically advantageous. Moreover, the message conveyed by the template 128 and the display panels 126 and 127 of prior art Indicator 125 (as discussed herein in relation to FIG. 1D through FIG. 1G) is confusing and difficult to understand. These problems and shortcomings are even more obvious when the thermochromatic liquid crystal Indicator 190 contains three display panels 196, 197 and 198 as discussed above and as illustrated in FIG. 1G.

Another problem associated with the prior art Indicators 120 and 190 is the lack of a thermo-insulative portion or top layer to protect the Indicator 120 from being impacted by external influences, such as ambient air flow or being touched by the user. Similarly, the prior art Indicator 120 lacks a thermo-responsive or thermo-conductive bottom layer that would better transfer the thermal energy from the PCM-filled panel 100 to the liquid crystal layer 125. Without such features, the prior art thermochromic liquid crystal strip 120 is exposed to external forces that result in either a less accurate indication of the temperature of the Object to which the Indicator 120 is attached, or an inaccuracy that needs to be accommodated for in the design of the Indicator containing the present inventions discussed herein.

Figure 2A:
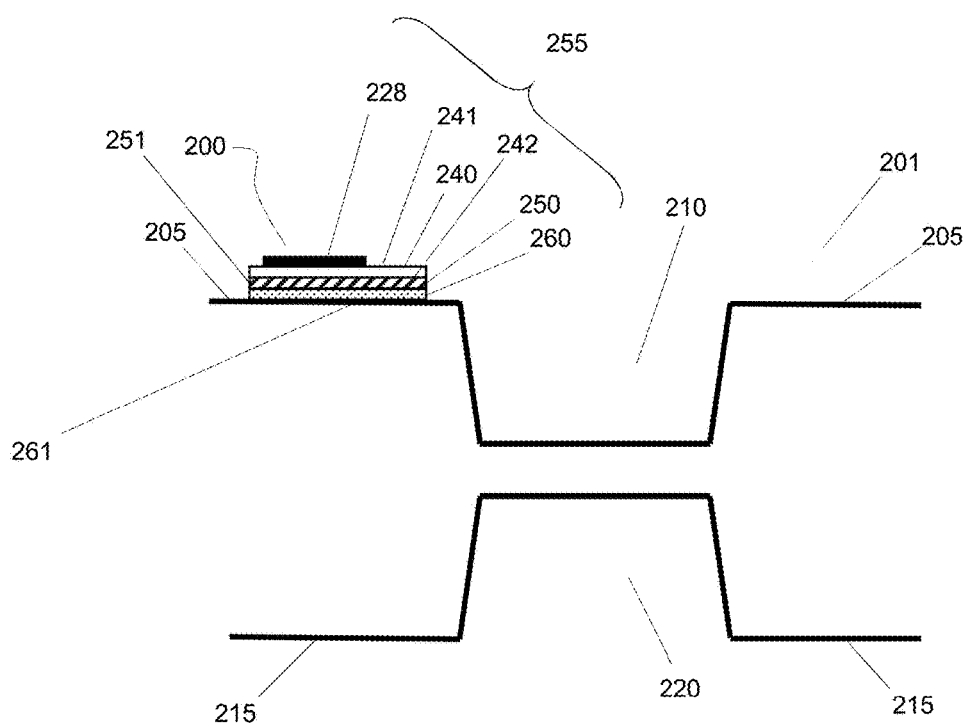
FIG. 2A is a close-up side cross-sectional view of the inventive thermochromic liquid crystal strip or Indicator and the prior art PCM-filled panel, with the inventive thermochromic liquid crystal strip or Indicator positioned on the top surface of the prior art PCM-filled panel.
Figure 2B:
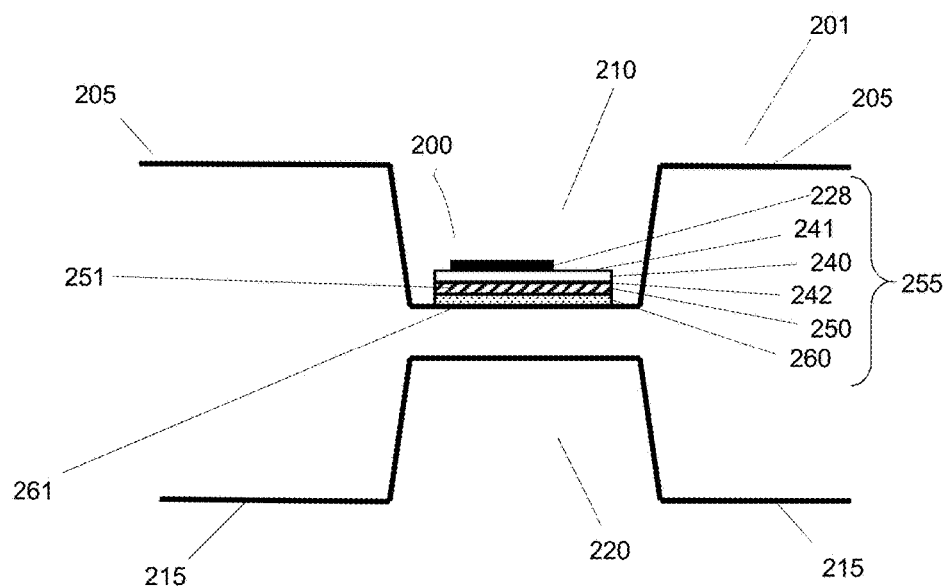
FIG. 2B is a close-up side cross-sectional view of the inventive thermochromic liquid crystal strip or Indicator and the prior art PCM-filled panel, with the inventive thermochromic liquid crystal strip or Indicator positioned in an indentation in the prior art PCM-filled panel.

To overcome the problems with the prior art Indicator 120 and the PCM-filled panel, in accordance with the purpose of the inventions as embodied, and both broadly described and illustrated herein, shown in FIG. 2A and FIG. 2B are one of the embodiments of the inventions disclosed herein. Specifically, FIG. 2A shows a novel Indicator strip 200 (also referred to herein more particularly as the thermochromic liquid crystal structure or "novel Indicator structure" 255), which can include a top layer 240, a backing layer 260 and a compartment 250 between the top layer 240 and the backing layer 260 that contains the thermochromic liquid crystal 251 and may contain either a template 228 or a mask 228. As disclosed herein, each of these portions of either the Indicator 200 or the Structure 255 may contain a single novel improvement or component, or multiple novel improvements or components that improve the operation of the entire Indicator 200.

Because of the nature of the thermochromic liquid crystal 251, a color change can occur when the thermochromic liquid crystal 251 is exposed to certain predetermined temperatures. As is known in the art and as disclosed in (by way of example only) U.S. Pat. No. 3,965,742, which is fully incorporated herein by reference in its entirety, a thermotropic or a thermochromic liquid crystal can be formulated and manufactured to produce a predetermined color at a predetermined temperature.

In regard to the present embodiment illustrated in FIG. 2A, the color of the thermochromic liquid crystal 251 can be viewed through the top layer 240 as the thermochromic liquid crystal 251 changes from one color to another in reaction to the changes in temperature. Both the top layer 240 and the backing layer 260 should, for certain embodiments, be constructed of a strong, resilient leak-proof material, such as plastic or other polymer material, so as to provide for the twisting or bending that might occur during transportation of the Object or the Product without tearing, breaking or leaking. The top layer 240 and the backing layer 260 may also be made of a material that preferably allows the top layer 240 and the backing layer 260 to be joined and sealed together, such as by heat stamping or other suitable means, although such sealing may not be not necessary. The top layer 240 and the backing layer 260 can both approximate the length and width of the liquid crystal compartment 250, although variations in these dimensions are within the scope of the present invention. The top layer 240 can preferably be made of a clear material, such as plastic, so that the user of the novel Indicator 200 can view at least some portion of the thermochromic liquid crystal 251 contained in the liquid crystal compartment 250. The top layer 240 should preferably, for certain embodiments be able to accept paint or ink so as to allow for coloring of a portion of the top layer 240 so as to allow a mask 228 or a template 228 to be created as discussed herein with regard to FIG. 5 and FIG. 6A.

At least some portion of the top layer 240 can be engineered to be able to accept paint or ink for coloring to form either a template 228 or a mask 228. In the case of using a template or mask 228, it is preferable that at least some portion of that top layer 240 remain free from ink or coloring so that the user of the novel Indicator structure 255 can observe the thermochromic liquid crystal 251 contained in the liquid crystal compartment 250 through the clear portion of the top layer 240. It will be understood by one of ordinary skill in the art that the template 228 could be applied to the bottom side 242 of the top layer 240, as well as to the top side 241 of the top layer 240 (as is described herein). By comparison, if a mask 228 is used in a given embodiment, as described in more detail hereinafter with regard to the mask 675 illustrated in FIG. 6B and discussed herein, it is preferable that all of the area of the top layer 240 assigned to the mask 675 have some ink or coloring so that the user of the novel Indicator structure 255 can observe the interaction of the colors reflected by the thermochromic liquid crystal 251 contained in the liquid crystal compartment 250 through the region of the top layer 240 reserved for the mask 675, and as further described herein.

Moreover, the top layer 240 can contain one or more of any well known components or ingredients that promote thermal insulation, so as to thermally insulate the thermochromic liquid crystal 251 from the effects of the user touching the novel Indicator structure 255 and/or from the effects of airflow and/or ambient air surrounding the novel Indicator structure 255. Including an ingredient that promotes thermal insulation from the effects of airflow and/or ambient air surrounding the composition of the top layer 240 aids in ensuring that the novel Indicator structure 255 can more properly reflect and indicate the temperature of the Object to which the novel Indicator structure 255 is attached, wherein the Object could be the PCM-filled panel 201.

The bottom side 261 of the bottom layer 260 should, for certain embodiments, also be able to accept paste, glue or other suitable adhesive for attaching the novel Indicator structure 255 to the Object which the novel Indicator structure is monitoring, such as the PCM-filled panel 201. Moreover, the backing layer 260 can be comprised of ingredients that lack insulative properties so as to promote the transmission of the temperature of the Object to which the backing layer 260 can be attached (such as the PCM-filled panel 201) to the thermochromic liquid crystal layer 250, so as to more accurately reflect the temperature of the Object.

Another embodiment of the inventions disclosed herein that overcomes the problems associated with the prior art Indicator strip 120 and the prior art PCM-filled panel 201 includes the modification of the liquid crystal 251 contained in the liquid crystal layer 250 so as to include an additive that aids in slowing down the response of the liquid crystal 251 to changes in temperature. By changing the responsiveness and speed at which the liquid crystal changes its spatial orientation, so that the liquid crystal changes its spatial orientation more slowly, the color reflected back to the user of the novel Indicator 200 will change to a different color more slowly. In this way, the novel Indicator 200 may be less influenced by the user touching the novel Indicator structure 255, and/or will be less influenced by the impact of ambient air impacting the novel Indicator structure 255. Consequently, the novel Indicator 200 can provide the user with a more accurate indication of the temperature of the Object, such as the PCM-filled panel 201.

As shown in FIG. 2B, the novel Indicator structure 255 has been sized so as to fit into one of the top indentations 210 (or alternatively one of the bottom indentations 220) in the prior art PCM-filled panel 201. There are several advantages to sizing the novel Indicator structure 255 to fit within one of the top indentations 210 or bottom indentations 220. An advantage to sizing the novel Indicator structure 255 to fit within one of the top indentations 210 or bottom indentations 220 is that it aids in moving the novel Indicator structure 255 out of the surrounding airflow and/or ambient air. Moving the novel Indicator structure 255 out of the surrounding airflow and/or ambient air can enable the thermochromic liquid crystal 251 to more accurately reflect the temperature of the Object to which the novel Indicator structure 255 can be attached (e.g., the PCM-filled panel 201). Another advantage to sizing the novel Indicator structure 255 to fit within one of the top indentations 210 or bottom indentations 220 is that such sizing can enable moving the novel Indicator structure 255 out of the top or bottom plane of the PCM-filled panel 201 so that the novel indicator structure can be protected from damage (e.g., scratching or impact) that would otherwise be inflicted on the novel Indicator structure 255 if it were positioned on the top plane of the Object 201. Moreover, as discussed herein, moving the novel Indicator structure 255 into one of the indentations 210 or 220 can enable the novel Indicator 200 (including the novel Indicator structure 255) to be in closer contact with the core temperature of the Object (e.g., the PCM contained in the PCM-filled panel 201). By being closer to the core temperature of the PCM, the novel Indicator 200 better and more accurately indicates the overall temperature of the Object.

FIG. 3A through FIG. 3F illustrate alternative embodiments of the novel Indicator structure 255 described in FIG. 2A and FIG. 2B, wherein the Indicator 300 displayed in FIG. 3A through FIG. 3F contains the various aspects and structural advantages described above in relation to FIG. 2A and FIG. 2B and incorporated herein in full, but also contains additional aspects so as to result in new embodiments.

Figure 3A:
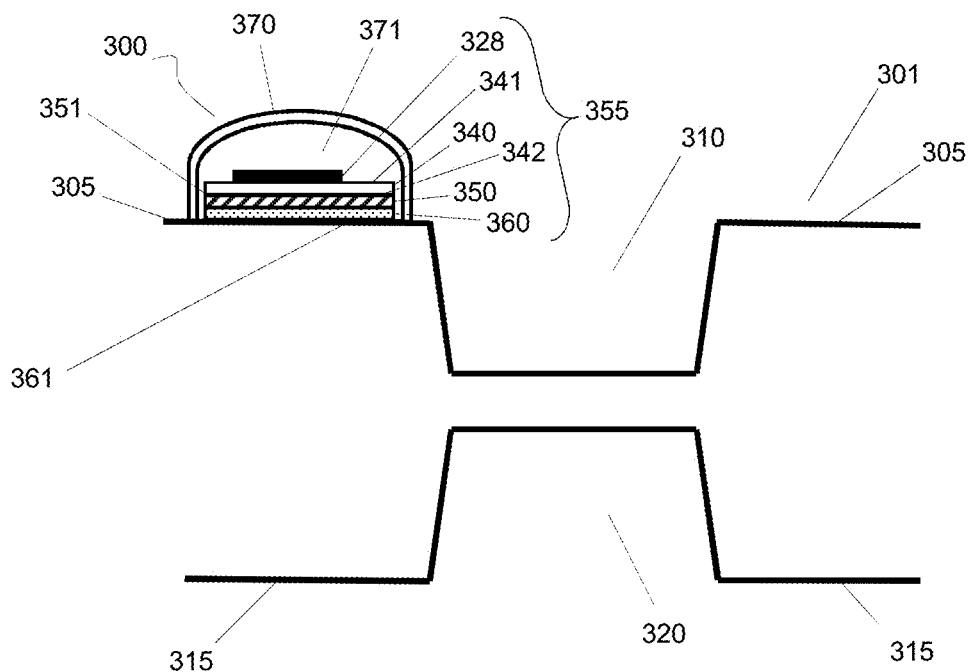
FIG. 3A is a close-up side cross-sectional view of the inventive Indicator that includes an insulative layer or housing surrounding at least the thermochromic liquid crystal strip, and which can be positioned on the top surface of the prior art PCM-filled panel.
Figure 3B:
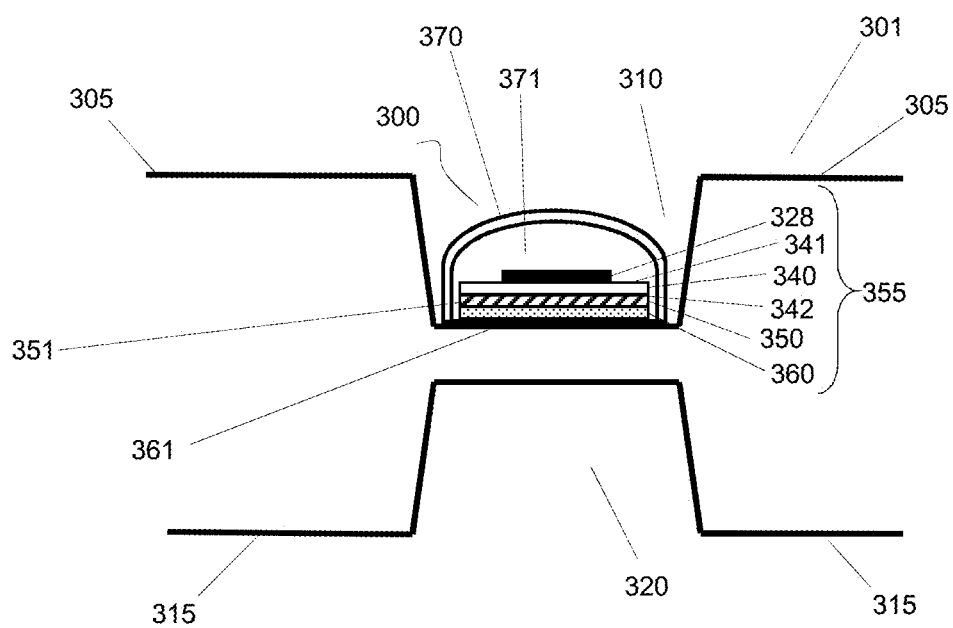
FIG. 3B is a close-up side cross-sectional view of the inventive Indicator that includes an insulative layer or housing surrounding at least the thermochromic liquid crystal strip, and which can be positioned in an indentation in the prior art PCM-filled panel.

One of the additional aspects illustrated in FIG. 3A through FIG. 3B that results in new embodiments of the novel Indicator 300 is the use of an insulative cap 370 that covers at least a portion, and preferably covers the entirety, of the novel Indicator structure 355. As shown in FIG. 3A through FIG. 3F, the novel Indicator structure 355 can include the mask 328, the top layer 340, the backing layer 360, and the resulting thermochromic liquid crystal compartment 350 that contains the thermochromic liquid crystal 351. All these components of the novel Indicator structure 355 can contain some or all of the improvements discussed above for the novel Indicator structure 255 (and by way of example only, can further contain an insulative component for the top layer 340 such that the top layer 340 is insulative, a dopant that slows the responsiveness of the thermochromic liquid crystal 351 contained in the thermochromic liquid crystal layer 350, and may not contain a thermally conductive component in the bottom layer 360 such that the bottom layer is not thermally conductive).

The purpose and benefit of using the insulative cap 370 is to further insulate the novel Indicator structure 355, including especially the thermochromic liquid crystal 351, from being touched by a user and/or from being impacted by the ambient air flow that would otherwise surround and impact the accuracy of the novel Indicator structure 355, so as to provide better indication of the core temperature of the Object (e.g., the phase change material contained in the PCM-filled panel 301).

The insulative cap 370 is preferably made of a clear material, such as plastic, so that the user of the novel Indicator 300 can view at least some of the color reflected by the thermochromic liquid crystal 351 contained in the novel Indicator structure 355. Although any material could be used to fill the space 371 between the insulative cap 370 and the novel Indicator structure 355, for purposes of effectiveness of carrying out the present invention in conjunction with economies of scale, the space 371 could simply be filled with air. Alternatively, the space 371 could be manufactured so as to contain a vacuum, which would provide the best possible insulation from external thermal impact, or could be filled with any other material known to one of ordinary skill in the art such as Nitrogen, so as to provide effective insulation while maintaining the transparency necessary to view the thermochromic liquid crystal 351.

Although FIG. 3A and FIG. 3B show the novel Indicator structure 355 being attached directly to the top side 305 of the PCM-filled panel 301, and depicts the insulative cap 370 being attached directly to the top side 305 of the PCM-filled panel 301 as well, it is possible that similar embodiments could be constructed where the insulative cap 370 can include a floor portion (not shown) to which the thermochromic liquid crystal novel Indicator structure 355 could be attached. That floor portion (not shown) could be attached to the insulative cap 370 by snap fitting, gluing or any other attaching mechanisms, and the entire resulting assembly being attached to the top side 305 of the PCM-filled panel 301 (or attached to the bottom side 315 of the PCM-filled panel 301), by gluing or other adhesive mechanisms.

As shown in FIG. 3B, the novel Indicator structure 355 has been sized so as to fit into one of the existing top indentations 310 in the prior art PCM-filled panel 301 (or alternatively one of the bottom indentations 320 contained in the bottom side 315 of the PCM-filled panel 301). There are several advantages to sizing the novel Indicator structure 355 to fit within one of the top indentations 310 or bottom indentations 320. One such advantage is that it aids in moving the novel Indicator structure 355 out of the touch of the user and/or out of the surrounding airflow and/or ambient air. Protecting the novel Indicator structure 355 in this manner can enable the thermochromic liquid crystal 351 to more accurately reflect the temperature of the Object to which the novel Indicator structure 355 is attached (e.g., the PCM-filled panel 301). Another advantage to sizing the novel Indicator structure 355 to fit within one of the top indentations 310 or bottom indentations 320 is that it moves the novel Indicator 300 out of the plane of the PCM-filled panel 301 so that it can be protected from damage (e.g., scratching or impact) that would otherwise be inflicted on the novel Indicator 300 if the novel Indicator were on the top plane of the Object. Moreover, as discussed herein, moving the novel Indicator structure 355 into one of the indentations 310 or 320 allows the novel Indicator structure 355 to be in closer contact with the core temperature of the Object (e.g., the PCM contained in the PCM-filled panel 301). By being closer to the core temperature of the PCM, the novel Indicator structure 355 better and more accurately indicates the temperature of the Object.

Figure 3C:
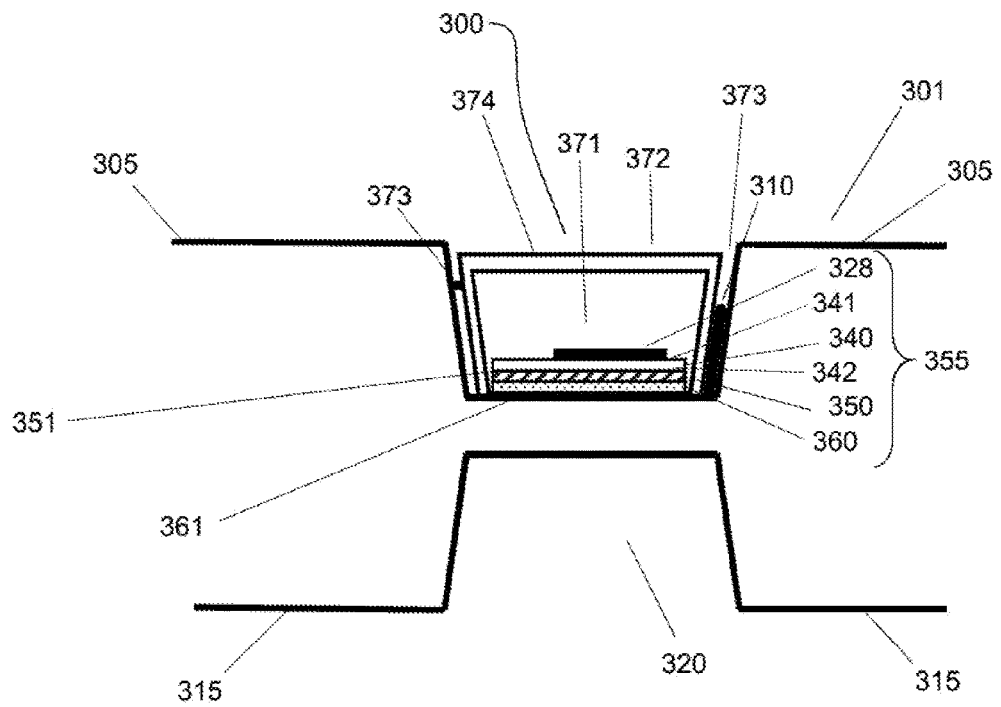
FIG. 3C is a close-up side cross-sectional view of the alternative embodiment of the inventive Indicator that includes an insulative layer or housing surrounding at least the thermochromic liquid crystal strip, and which can be positioned in an indentation in the prior art PCM-filled panel.

An alternate embodiment to the embodiment shown in FIG. 3A and FIG. 3B is illustrated in FIG. 3C, where the shape of the insulative cap 370 from FIG. 3A and FIG. 3B is modified so as to match the dimensions of one of the top indentations 310 or alternatively one of the bottom indentations 320. A benefit from forming this insulative cap 374 to match the dimensions of one of the top indentations 310 or alternatively one of the bottom indentations 320 as closely as possible is that the insulative cap 374 can further reduce the amount of airflow over and around the novel Indicator structure 355. As explained herein, reducing the amount of airflow over and around the novel Indicator structure 355 can enable the thermochromic liquid crystal 351 to better match the temperature of the core of the Phase Change Material within the PCM-filled panel 301.

As mentioned herein, the top portion 372 of the insulative cap 374 is preferably sized so as to be slightly below the plane of the top layer 305 of the PCM-filled panel 301 so as to prevent the insulative cap 374 from getting scratched or damaged, as such damage or scratching can negatively impact the use and operation of the novel Indicator 300. The operation of the insulative cap 374 may even be better improved if a sealant 373, such as silicone or other sealing material, were used to even better isolate the Structure 355, and more particularly better isolate the thermochromic liquid crystal 351, from the touch of the user and/or the ambient air and airflow surrounding the PCM-filled panel 301, so as to better allow the novel Indicator structure 355 and more particularly the thermochromic liquid crystal 351 to match the temperature of the core of the Phase Change Material within the PCM-filled panel 301. Moreover, as discussed herein, moving the novel Indicator 300 into one of the indentations 310 or 320 allows the novel Indicator 300 (including the novel Indicator structure 355) to be in closer contact with the core temperature of the Object (e.g., the PCM contained in the PCM-filled panel 301). By being closer to the core temperature of the PCM, the novel Indicator 300 better and more accurately indicates the temperature of the Object.

Although FIG. 3C shows the thermochromic liquid crystal novel Indicator structure 355 being attached directly to the top side 305 of the PCM-filled panel 301, and depicts the insulative cap 374 as directly touching the top side 305 of the PCM-filled panel 301, it is possible that similar embodiments could be constructed where the insulative cap 374 contains a floor portion (not shown) to which the Structure 355 could be attached. That floor portion (not shown) could be attached to the insulative cap 374 by snap fitting, gluing or any other useful means, and the entire resulting assembly being attached to the top side 305 of the PCM-filled panel 301 (or attached to the bottom side 315 of the PC-filled panel 301), by gluing or other means.

Figure 3D:
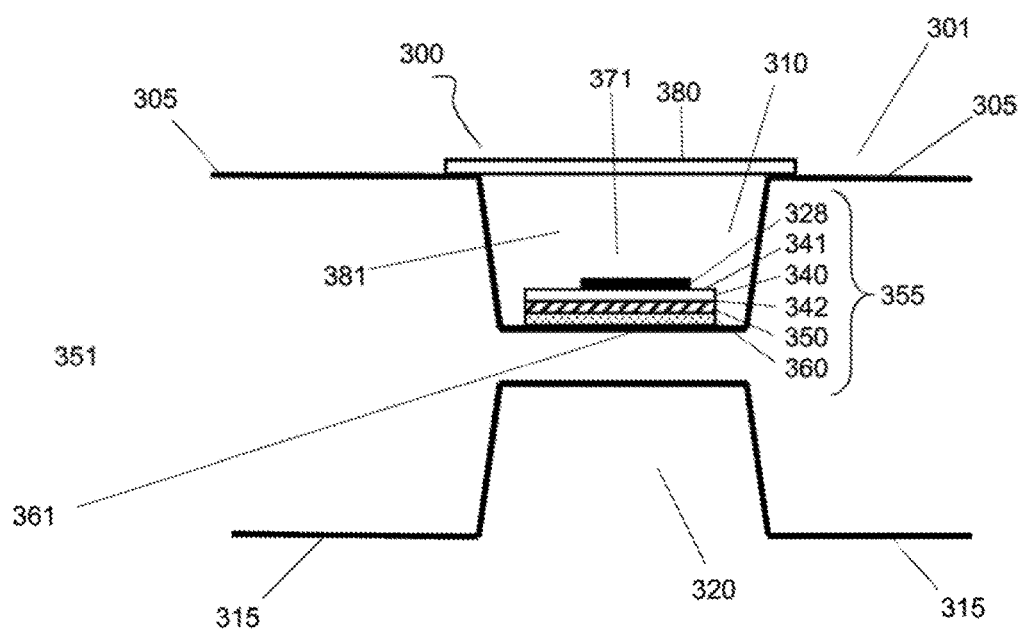
FIG. 3D is a close-up side cross-sectional view of the alternative embodiment of the inventive Indicator that includes an insulative cap covering at least the thermochromic liquid crystal strip, and which can be positioned in an indentation in the prior art PCM-filled panel.

An alternate embodiment to the embodiments shown in FIG. 3A, FIG. 3B and FIG. 3C is illustrated in FIG. 3D, wherein the insulative cap 370 or 374 of FIG. 3A, FIG. 3B and FIG. 3C can be replaced with an insulative sheet 380 that aids in further reducing the amount of airflow over and around the thermochromic liquid crystal Structure 355. Alternatively, although not depicted, the insulative cap 370 or insulative cap 374 could be used in conjunction with the insulative sheet 380. This insulative sheet 380, which allows novel Indicator structure 355, and more particularly the thermochromic liquid crystal 351, to better match the temperature of the core of the phase change material within the PCM-filled panel 301 because the insulative sheet 380 allows the novel Indicator structure 355, and more particularly the thermochromic liquid crystal 351 to be isolated from the airflow and ambient air that enters the top indentations 310 and/or the bottom indentations 320. The space 371 created by covering the top indentations 310 and/or bottom indentations 320 could be filled with any of the materials discussed herein or known in the art to provide insulative effects. Moreover, as discussed herein, moving the novel Indicator structure 355 into one of the indentations 310 or 320 allows the novel Indicator structure 355 to be in closer contact with the core temperature of the Object (e.g., the PCM contained in the PCM-filled panel 301). By being closer to the core temperature of the PCM, the novel Indicator structure 355 better and more accurately indicates the temperature of the Object.

Figure 3E:
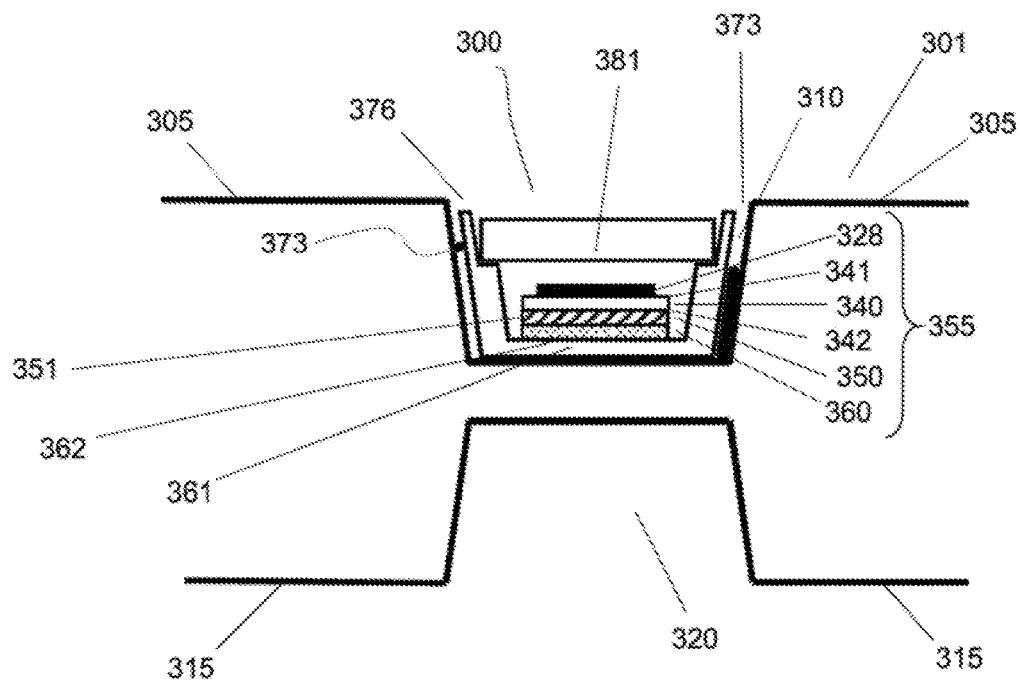
FIG. 3E is a close-up side cross-sectional view of an alternative embodiment of the inventive Indicator that includes an insulative layer or housing that surrounds at least the thermochromic liquid crystal strip, and which contains a pressure fit sealing disc as part of the insulative body, all of which can be positioned in an indentation in the prior art PCM-filled panel.

An alternate embodiment to the embodiment shown in FIG. 3A through FIG. 3D is shown in FIG. 3E, where a novel Indicator housing 361 is positioned into one of the indentations 310 or 320. The novel Indicator housing 361 contains a floor portion 362 upon which the novel Indicator structure 355 sits. The novel Indicator housing 361 can be a polypropylene, such as Achieve 1605 from Exxon Mobil. The housing material is preferably comprised of a material that is: 1) injection-moldable (thermoplastic); 2) low-cost/commonly available; and 3) of suitable modulus to snap fit to the disc 381. Furthermore, the floor portion 362 of the novel Indicator housing 361 should, for certain embodiments be thermoconductive so as to transfer thermal energy from the Object (e.g., the PCM-filled panel) to the liquid crystal 351 contained in the novel Indicator structure 355.

Moreover, the shape of the novel Indicator housing 361 is modified so as to match the dimensions of one of the top indentations 310 or alternatively one of the bottom indentations 320. A benefit from forming this novel Indicator housing 361 to match the dimensions of one of the top indentations 310 or alternatively one of the bottom indentations 320 as closely as possible is that it further reduces the amount of airflow over and around the novel Indicator structure 355. As explained herein, reducing the amount of airflow over and around the novel Indicator structure 355 can enable the thermochromic liquid crystal 351 to better match the temperature of the core of the Object to which the novel Indicator structure 355 is attached (e.g., the Phase Change Material within the PCM-filled panel 301).

To avoid the scratching that might occur to the top sheet from FIG. 3D, the novel Indicator housing 361 contains a top disc 381 that can be recessed below the plane of the top level 305 of the PCM-filled panel 301. The disc 381 can be a 3-mm thick mar-resistant acrylic, such as ACRYLITE® Optical mar resistant, sheet, Colorless 0A000 MR2 from Evonik). Clear acrylic can be selected over polycarbonate, because the polycarbonate can age and yellow over time. Preferably the mar resistant disc 381 can be placed in the novel Indicator housing 361 with the mar resistance towards the outside, which allows the mar resistance of the disc 381 to maintain the optical function of the indicator even as the indicator is repeatedly reused and exposed to handling that might scratch an unprotected acrylic. The thickness of the disc 381 does not affect the function of the novel Indicator 300, but can provide some UV-blocking that can help stability of the Indicator. Recessing the disc 381 slightly below the plane of the top layer 305 of the PCM-filled panel 301 can prevent the disc 381 from getting scratched or damaged; as such damage or scratching can negatively impact the use and operation of the novel Indicator 300.

An alternative housing that can self-seal the acrylic disc or other acrylic viewing window could be manufactured using a soft, elastomeric resin, for example Santoprene 101-55 or Santoprene 101-64. In this case, an acrylic disc with a diameter slightly larger than the opening of the injection molded housing should, for certain embodiments be used. The housing then can be stretched within its elastic strain region around the acrylic disc such that the stretched housing exerts a normal force on the perimeter of the acrylic disc. The pressure applied to the perimeter of the acrylic disc can create a moisture-resistant seal.

The use of a novel Indicator housing 361 may be further improved if a sealant 373, such as silicone or other sealing material, were used to even better isolate the Structure 355 by sealing up the opening 310 between the side walls of the insulative cap 376 and the upper walls of the PCM-filled Panel 301, and more particularly better isolate the thermochromic liquid crystal 351, from the touch of the user and/or the ambient air and airflow surrounding the PCM-filled panel 301, so as to better allow the novel Indicator structure 355 and more particularly the thermochromic liquid crystal 351 to match the temperature of the core of the Phase Change Material within the PCM-filled panel 301. Moreover, as discussed herein, moving the Indicator 300 into one of the indentations 310 or 320 allows the novel Indicator 300 (including the thermochromics liquid crystal novel Indicator structure 355) to be in closer contact with the core temperature of the Object (e.g., the PCM contained in the PCM-filled panel 301). By being closer to the core temperature of the PCM, the novel Indicator 300 better and more accurately indicates the temperature of the Object.

Figure 3F:
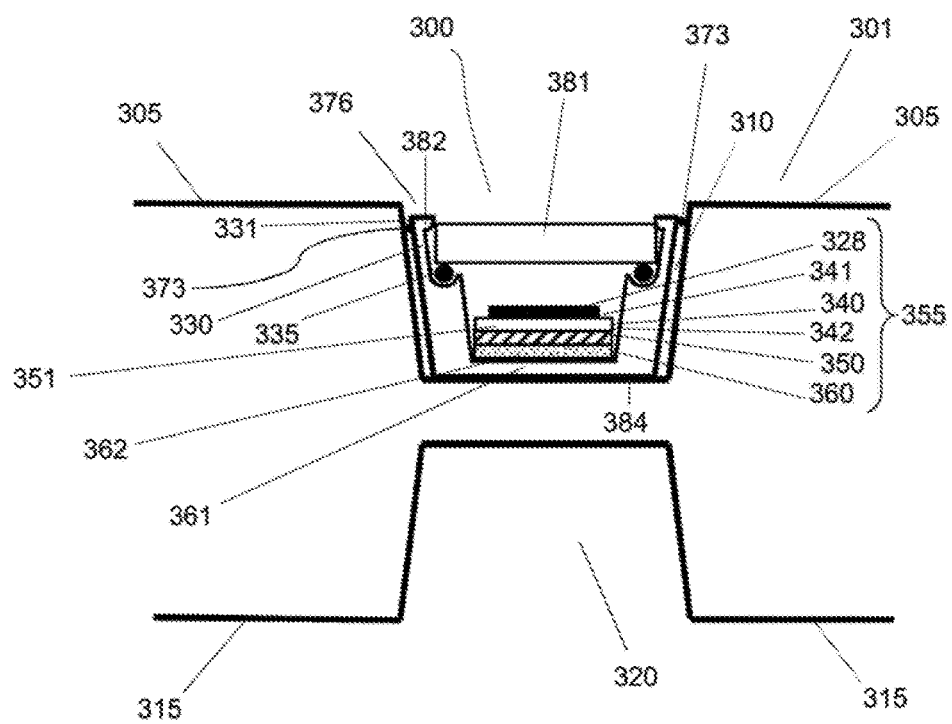
FIG. 3F is a close-up side cross-sectional view of an alternative embodiment of the inventive Indicator that includes an insulative layer or housing that surrounds at least the thermochromic liquid crystal strip, and which contains a pressure fit sealing disc used in conjunction with a sealing O-ring as part of the insulative body, all of which can be positioned in an indentation in the prior art PCM-filled panel.

As shown in FIG. 3F, to aid in eliminating the possibility that condensation could enter into the interior of the novel Indicator 300, an O-ring 335 could be placed between the bottom of the disc 381 and the upper edge 382 of a housing wall 330. Note that the upper edge 382 of the housing wall 330 can hold the disc 381 in place and pull the disc 381 down to compress the O-ring 335 so as to create a moisture resistant seal.

This O-ring 335 could also aid in reducing the negative effect of the ambient air flow on the accuracy of the Structure 355 and more particularly the thermochromic liquid crystal 351. The O-ring can be a 50 to 70 durometer. Preferably, the O-ring should, for certain embodiments match the color of the housing 331, such that the O-ring 335 does not distract from the Indicator. Although the top disc 381 could be held in place by the upper edges 382 of the housing wall 330, the top disc 381 could also be attached by snap fitting or by any other attaching mechanism, such as gluing.

A double-sided tape, such as 3M (#9087), can be used to adhere the bottom surface 384 of the housing 383 to a top surface 305 of one of the top indentations 310 or alternatively to the top surface 315 of one of the bottom indentations 320. The thickness of the tape can be about 10 mils so as to be thick enough to fill in any unevenness in the panel surface 305 or 315. Further, the tape could for example have a thermally conductive capability to transfer thermal energy into the housing 383. In an alternative, a thermally conductive glue can be used instead of tape.

Figure 4A:
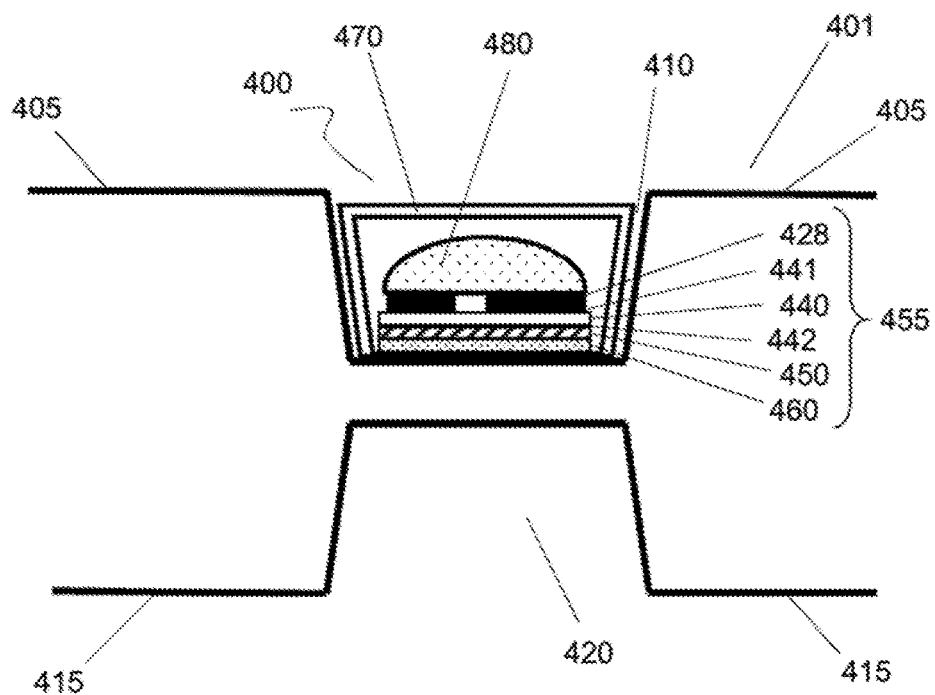
FIG. 4A is a close-up side cross-sectional view of an alternative embodiment of the inventive Indicator that includes a magnifying optic positioned above the thermochromic liquid crystal strip and positioned inside an insulative layer or housing that surrounds at least the thermochromic liquid crystal strip, and which can be positioned in an indentation in the prior art PCM-filled panel.
Figure 4B:
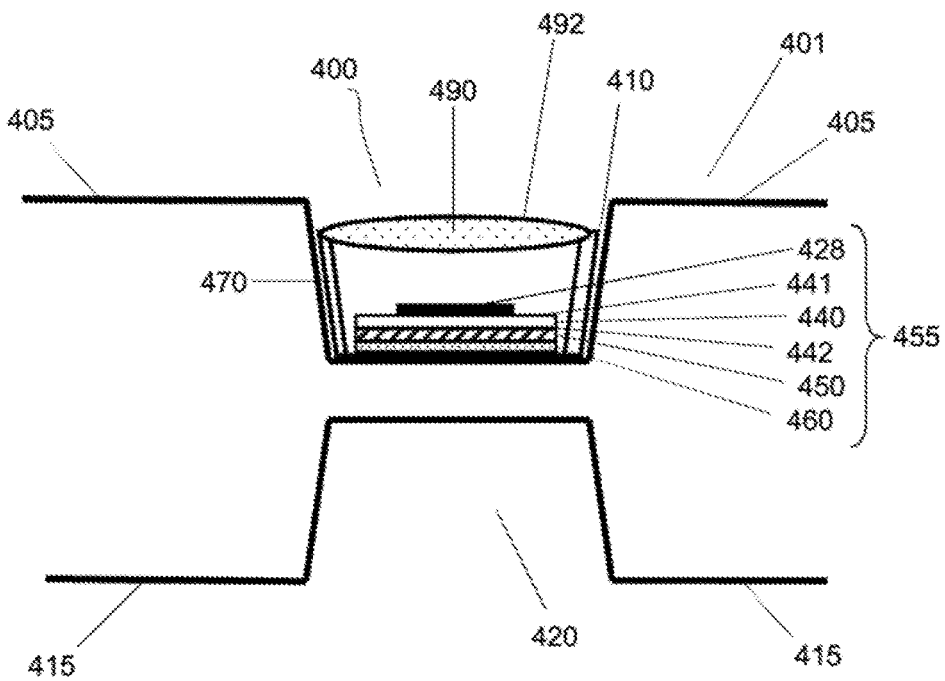
FIG. 4B is a close-up side cross-sectional view of an alternative embodiment of the inventive Indicator that includes a magnifying optic positioned as part of the insulative layer or housing that surrounds at least the thermochromic liquid crystal strip, and which can be positioned in an indentation in the prior art PCM-filled panel.

FIG. 4A and FIG. 4B illustrate an alternative embodiment of the inventive Indicator described herein, wherein the Indicator 400 contains the various aspects described above in relation to FIG. 2A and FIG. 2B as well as FIG. 3A through FIG. 3F, but also contains additional optional aspects so as to result in a new embodiment. One of the additional aspects illustrated in FIG. 4A and FIG. 4B is use of an optic device 480 and 490 to magnify the color and/or message presented by the Structure 455, and more particularly the thermochromic liquid crystal 451.

In the embodiment shown in FIG. 4A, the optic 480 can be placed atop the top layer 440 and the mask 428 or template 428 of the novel Indicator structure 455, but below the insulative cover 470 of the novel Indication 400. Alternatively, as shown in FIG. 4B the optic device 490 could be embedded or formed as part of the insulative cap 470. Preferably, if the optic device 490 can be formed as part of the insulative cap 470, the top portion 492 of the optic device 490 would preferably be below the plane of the top layer 405 of the PCM-filled panel 401 so as to prevent damage to or scratching of the optic device 490.

Figure 5:
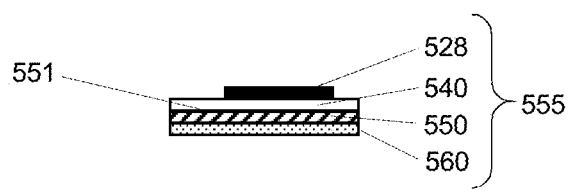
FIG. 5 is a side cross-sectional view of the inventive thermochromic liquid crystal strip or Indicator showing the mask that can be used to convey a message to the user, positioned on top of the thermochromic liquid crystal strip or Indicator.

The optic device 480 and 490 could be formed by any material that provides magnification of the message generated by the interaction of the mask 428 positioned on the top layer of the top portion 440 of the novel Indicator structure 455 in conjunction with the thermochromic liquid crystal 451 and as further explained herein regarding the description of FIG. 5. For example, the optic devices 480 and 490 of FIGS. 4A and 4B could be formed using a clear plastic semi-circle shaped dome that can be filled with a liquid, gel or air or any other material so long as it aids in the magnification of the message displayed by the interaction of the mask 428 and the thermochromic liquid crystal 451. Alternatively, the optic device 480 and 490 could be comprised of plastic or glass or similar material that when formed correctly, provides a magnification of the material underneath it.

The optic device 490 can be used in the inventive novel Indicator 400 because it can enable the novel Indicator 400 to be smaller than it would otherwise be, thereby allowing the novel Indicator 400 to fit into the top indentation 410 or the bottom indentation 420 without a loss of the ability of the user to view the message displayed by the interaction of the mask 428 or template 428 with the thermochromic liquid crystal 451. As discussed herein, allowing the novel Indicator structure 455 to be at least partially and preferably wholly removed from the airflow and/or ambient air surrounding the PCM-filled panel 401 can enable the novel Indicator structure 455 and more particularly the thermochromic liquid crystal 451 to better match the temperature of the phase change material within the PCM-filled panel 401. Moreover, as discussed herein, moving the novel Indicator 400 into one of the indentations 410 or 420 can enable the novel Indicator 400 to be in closer contact with the core temperature of the Object (e.g., the PCM contained in the PCM-filled panel 401). By being closer to the core temperature of the PCM, the Indicator 400 better and more accurately indicates the temperature of the Object.

FIG. 5 illustrates components of the novel Indicator structure 555 as it sits in relation to the mask 528 or template 528. The use of a mask 528 or template 528 not only conveys the message(s) to the user about the state of the temperature of the Object (e.g., the PCM-filled panel), but the mask 528 (as further described herein in conjunction with the illustrations in FIG. 6B) in certain embodiments narrows the range of the color reflected by the thermochromatic liquid crystal 551 positioned in the liquid crystal compartment 550 to the user. By narrowing the range of the colors displayed to the user, the novel Indicators 200, 300 and 400 can have a much narrower range of temperature, as measured by the Color Display Range, to be monitored and displayed to the user. Thus, the novel Indicators 200, 300 and 400 discussed herein, should be understood to employ the embodiments of the template 528 or mask 528 discussed herein in regard to FIG. 5 and the template 625 or mask 635 discussed herein in regard to FIG. 6A though FIG. 6D.

Such narrowing of the colors displayed to the user bypasses the problem of having colors displayed by a liquid crystal strip when those colors are associated with a temperature outside of the desired temperature range. By way of example only, without the inventions disclosed herein a user would generally be unable to display a Color Display Range that is two degrees Celsius wide because as one of ordinary skill in the knows, the tightest temperature resolution that a green color or a red color can be displayed is 0.5° C., which results in a Color Display Range of four degrees Celsius ((one degree Celsius for the red Color Range)+(one degree Celsius for the green Color Range)+(one and one-half degree Celsius for the blue Color Range)+(one and one-half degree Celsius for the purple Color Range)). With the inventions discussed herein, however, the Color Display Range can be narrowed to one degree Celsius or two degree Celsius by applying a mask to the liquid crystal layer that filters out the blue Color Range and the purple Color Range, while allowing the red Color Range and the green Color Range to pass through. Moreover, such narrowing can eliminate the need for the use of the prior art thermochromic liquid crystal strips, such as discussed herein in regard to FIG. 1D through FIG. 1G containing multiple panels and multiple formulations, because the user can rely on a thermochromic liquid crystal strip or thermochromic liquid crystal structure or thermochromic liquid crystal device containing just a single display panel. Doing so can eliminate the need for more than one thermochromic liquid crystal formulation, and thus eliminate the cost associated with the manufacture of more than one thermochromic liquid crystal formulation. Further, doing so can also eliminate the confusion that arises from the use of two or more thermochromic liquid crystal formulations (and the multiple permutations generated by their use, as explained herein in relation to FIG. 1D through FIG. 1G).

These advantages are generated, as illustrated in FIG. 6A through FIG. 6D in conjunction with FIG. 5, due to the operation of physics and optics by and on the component parts of the novel Indicator structure 555. Specifically, as described herein, thermochromic liquid crystals can reflect different colors depending on the temperature the thermochromic liquid crystals are exposed to. Liquid crystal formulations are characterized by its associated Red Start temperature and its Color Play. Below the Red Start temperature, a liquid crystal film may appear black because the top layer of the bottom layer can typically be painted black. However, as the film is heated throughout the Color Display Range of a given novel Indicator, the novel Indicator can first appear red, then appear green, then appear blue, then appear purple and finally become black again as the temperature is increased over a given temperature range. For simplicity, and as described herein, the temperature ranges over which the colors can be seen is typically well-defined.

For example, a liquid crystal formulated to have a Red Start temperature of about 2.0° C. will appear black at temperatures below 2.0° C. Further, if this formulation has a Color Play (which is the equivalent of the Color Range of red, plus the Color Range of green) of about two degrees Celsius, the color red will be visible from about 2.0° C. until it reaches about 3.0° C., when the color green (with a Color Range of one about degree Celsius) will be visible. The green Color Range will last from about 3.0° C. until it reaches about 4.0° C. when it starts to turn blue. It should be noted that the transition from green to blue is not a sharp one, as the color blue contains many hues of green (i.e., the color blue contains many different wavelengths associated with the color green). The color blue, with its Color Range of about three and one-half times that of red or green, will then be visible from about 4.0° C. to about 7.5° C., when it begins to turn purple. The color purple, with its Color Range of about three and one-half times that of red or green, will then be visible from about 7.5° C. until about 11.0° C., at which point the liquid crystal films will appear black because of the black color of the backing layer of the strip. The extended Color Ranges of the color blue and the color purple in comparison to the Color Range of the color red and the color green collectively, is a feature common to thermotropic and thermochromic liquid crystal formulations. The combination of all these Color Ranges results in a Color Display Range equal to nine degrees Celsius.

A way to collapse that nine degrees Celsius Color Display Range to a narrower one is what is desirable. There are at least two ways to accomplish this. The first, as shown in FIG. 6A, employs a template 625 or 635 of a single solid color, and that alternately: i) contrasts with and blocks all color reflected by the thermochromic liquid crystal in the novel Indicator or novel Indicator structure 555 when the thermochromic liquid crystal is at a certain temperature or certain set of temperatures; and ii) blends in with but still blocks the color reflected by the thermochromic liquid crystal in the novel Indicator or novel Indicator structure 555 when the thermochromic liquid crystal is at a second temperature or second set of temperatures, so as to convey a message to the user only at predetermined temperatures.

Figure 6A:
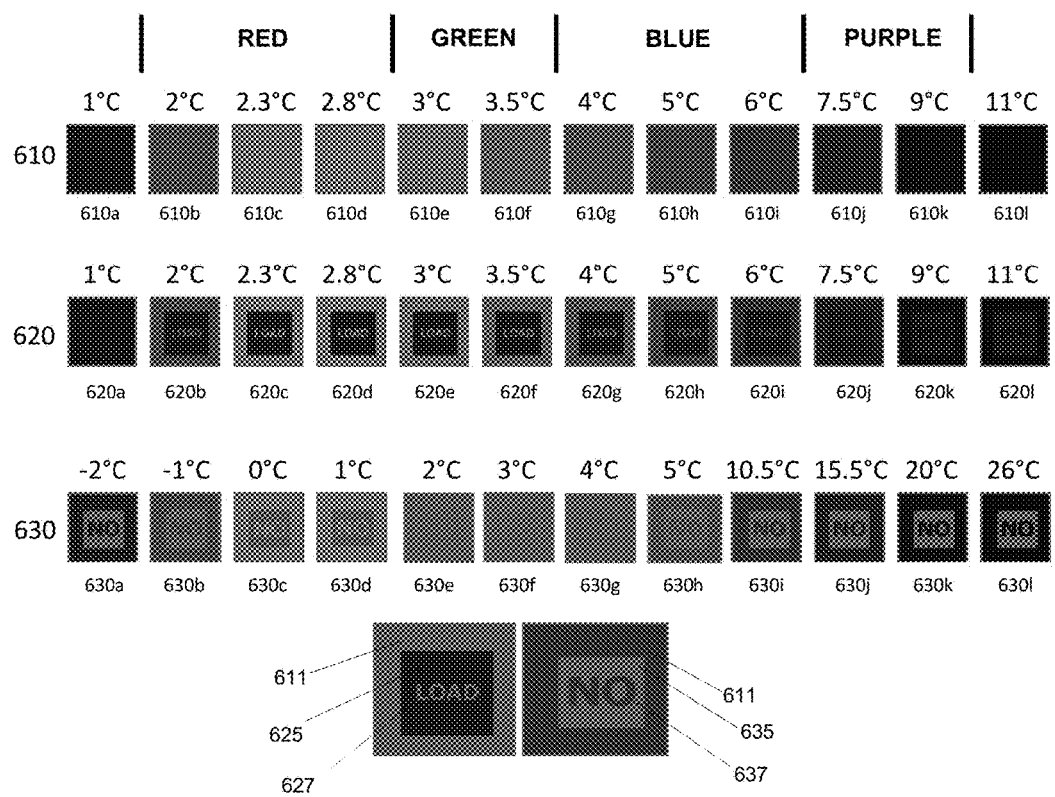
FIG. 6A is both an overhead view and a listing of the representations of the colors and messages displayed by the single portion template that could be positioned on top of or as part of the thermochromic liquid crystal strip that shows how the message conveyed by the template can be transmitted to the user depending on the temperature of the thermochromic liquid crystal Indicator.
Figure 6B:
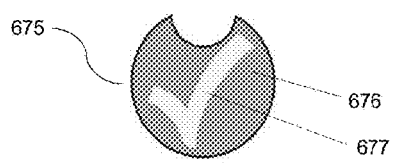
FIG. 6B is both an overhead view and a listing of the representations of the colors and messages displayed by the multiple portion mask that could be positioned on top of or as part of the thermochromic liquid crystal strip that shows how the message conveyed by the mask can be transmitted to the user depending on the temperature of the thermochromic liquid crystal Indicator.
Figure 6B:
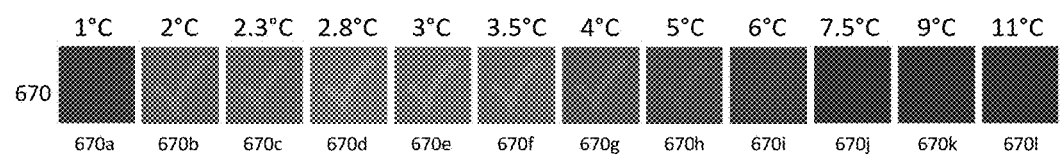

The second, as shown in FIG. 6B, employs a mask 670 comprised preferably of two separate portions, wherein each portion is a different color. And each color of the mask interacts with a color reflected by the thermochromic liquid crystal in the novel Indicator or novel Indicator structure 555 when the thermochromic liquid crystal is at a certain temperature or certain set of temperatures (the "reflected color(s)"). More specifically, each portion of the mask 670 will selectively allow certain reflected color(s) to pass through so that they can be viewed by the user, while simultaneously selectively blocking or filtering certain other reflected color(s) from passing through so that they cannot be viewed by the user. In this embodiment not only can a message be displayed (due to either just the user viewing the color(s) not filtered out, or by the two colors interacting so as to form a message or indication), but the Color Display Range can be narrowed a great deal more than by using the template 625 or 635 described herein in regard to FIG. 6A.

It should be noted that the mask 670 can be achieved by only using a single portion (i.e., a single color filter), but the mask 670 works better when the two colors are used because of the contrast provided the two colors interacting with each other to form the indication or message.

In regard to the embodiment illustrated in FIG. 6A, it is useful to start the description of the embodiment without a template in place, which is shown in row 610 of FIG. 6A. All of FIG. 6A (i.e., Row 610, Row 620 and Row 630) is a representation of the what a user would see when looking at the top layer 540 of a novel Indicator structure 555 illustrated in FIG. 5, but in a top down view of that top layer 611, so as to provide an example of the novel Indicator or novel Indicator structure 555 as it moves through its Color Display Range, (with each panel in each Row (i.e., Panel 610a, Panel 610b, etc.) being a representation of a color displayed by an example liquid crystal novel Indicator structure 555 at a specific temperature.

The exemplary novel Indicator structure 555 in Row 610 has a Red Start temperature of 2° C., and a Color Range of about one degree Celsius, thereby causing the liquid crystal novel Indicator structure 555 to reflect red through the top layer 540 of the novel Indicator structure 555, (which is the top layer 611 in all of FIG. 6A) in the range between 2° C. and 3° C. Similarly, the same liquid crystal novel Indicator structure 555 has a Green Start temperature of about 3° C., and a Color Range of one about degree Celsius thereby causing a green color in the range of about 3° C. to about 4° C. The Blue Start of the blue color is at about 4° C. and because the blue has a Color Range of about three and one-half degrees Celsius, the novel Indicator structure 555 is blue from about 4° C. to about 7.5° C. will start turning from blue to purple at about 7.5° C. It should be noted that the transition from green to blue is not a sharp one, as the color blue contains many hues of green (i.e., the color blue contains many different wavelengths associated with the color green). Finally, the purple color has a Purple Start at about 7.5° C. with a Color Range of about three and one-half degrees, and so the novel Indicator structure 555 is will be purple from about 7.5° C. until about 11° C., where it turns black.

More particularly, as shown in FIG. 6A Row 610, as the novel Indicator or novel Indicator structure 555 in FIG. 6A Row 610 rises from 0° C. to 1° C., the novel Indicator would have not yet reached its Red Start temperature and would be a black color 610a. But then at about 2° C. the novel Indicator or novel Indicator structure 555 would reflect through the top layer 611 the start of a red color 610b, and as the temperature warms to about 2.3° C. the color of the novel Indicator or novel Indicator structure 555 is a more intense red 610c. As the novel Indicator or novel Indicator structure 555 continues to warm to about 2.8° C., the red color becomes more like a red with a hint of green 610d. Because the Color Range of the red color is only about one degree Celsius, as the temperature continues to rise and reaches the about 3° C. Green Start, the novel Indicator structure 555 or Indicator begins to turn green 610e. At about 3.5° C. the color of the novel Indicator structure 555 or Indicator can be a more intense green 610f. Because the Color Range of the green color is only about one degree Celsius, at about 4° C. the novel Indicator structure 555 or Indicator begins to turn blue 610g. At 5° C. the novel Indicator structure 555 can reflect a greenish blue 610h because of green hues or wavelengths still being reflected by the liquid crystal to the user. Because the Color Range of blue is larger than either red or green, at about 6° C. the Structure or Indicator will still be blue 610i and has lost most or all of the greenish hues, and at about 7.5° C. the novel Indicator structure 555 or Indicator will start to turn to purple 610*j*. At about 9° C. the novel Indicator structure 555 or Indicator will start to move from purple to a purple-black 610*k*, and because the Color Range of purple is about three and one-half degrees Celsius, at about 11° C. the novel Indicator structure 555 or Indicator is black 610*l*.

Figure 1H:
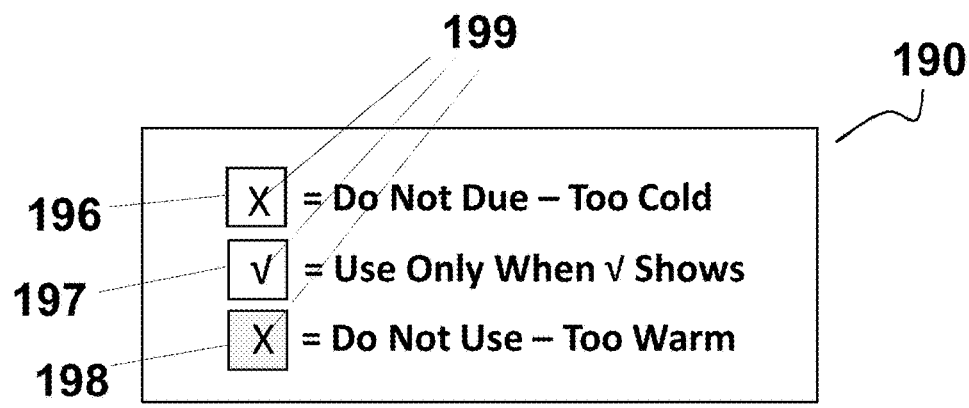
FIG. 1H is a three display panel prior art Indicator.
Figures 6C, 6D, 6E:
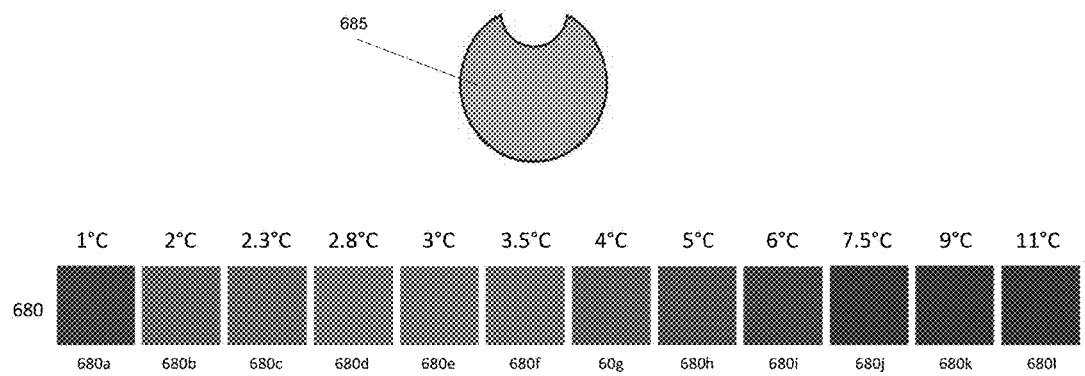
FIG. 6C is a listing of many of the possible positive messages that can be conveyed to the user by use of the template or the mask in conjunction with the color changes of the thermochromic liquid crystal strip or Indicator.
FIG. 6D is a listing of many of the possible negative messages that can be conveyed to the user by use of the template or the mask in conjunction with the color changes of the thermochromic liquid crystal strip or Indicator.
FIG. 6E is both an overhead view and a listing of representations of the colors displayed by a single mask that could be positioned on top of or as part of the thermochromic liquid crystal strip that shows how the indication or message conveyed by the mask can be transmitted to the user depending on the temperature of the thermochromic liquid crystal Indicator.

As discussed herein, when an end user used a prior art Indicator to discern temperature, instructions or messages similar to those shown in FIG. 6C and FIG. 6D are typically provided to the user, so that the user can know how to interpret either the temperature of the prior art Indicator, or know what to do when the prior art Indicator is at a certain temperature. For instance, language may be included near the prior art Indicator 120 or in a separate document (see for example FIG. 1G or FIG. 1H), that contains user instructions declaring by way of example only, "if a red, green or blue color is visible, then temperature is in the range between 2° C. and 8° C." or more precisely "if a red color is visible then the temperature is between 2° C. and 3° C., if a green color is visible then the temperature is between 3° C. and 4° C., and if a blue temperature is visible then the temperature is between 4° C. and 8° C."

Turning back to the embodiment illustrated in FIG. 6A, in order to simplify the interpretation of thermochromic liquid crystal Indicators as well as to narrow the number of colors displayed in the Color Display Range, a template 625 may be printed on the top layer 540 of the novel Indicator structure 555, so that as the template contrasts with the color displayed through the top layer 611 it reveals a message or instruction to the user when the Indicator is at a first temperature or first range of temperatures, and then the template 625 blends in with the color reflected by the novel Indicator structure 555 through the top layer 611 when the novel Indicator structure 555 is at a second temperature or second set of temperatures. As discussed herein, FIG. 6A employs a template 625 that can preferably be a single solid color, wherein that solid color: i) contrasts with and blocks all colors reflected by the thermochromic liquid crystal in the novel Indicator structure 555 or Indicator through the top layer 611 when the thermochromic liquid crystal is at a first temperature or first set of temperatures; and ii) blends in with but still blocks the color reflected by the thermochromic liquid crystal in the novel Indicator structure 555 or Indicator through the top layer 611 when the thermochromic liquid crystal is at a second temperature or second set of temperatures, wherein that blending and contrasting serve to convey a message to the user only at predetermined temperatures.

By way of example only, Row 620 in FIG. 6A illustrates how to display a message to the user (e.g., "LOAD") when the user is interested in knowing when the Object is within the predetermined Packing Temperature Range of between about 2° C. (Panel 620*b*) and about 5° C. (Panel 620*g*) so that he or she knows it is safe to assemble the cooler system and load the Product into the assembled cooler system. This embodiment is very useful when the end user is not interested in the precise temperature of the Object, but rather is interested to know if the temperature of the Object is within a certain temperature range. This approach is based on the Color Ranges described herein for Row 610, but as shown in FIG. 6A Row 620 and Row 630, a template 528 or 625 can be placed on top of the top layer 540 of the exemplary liquid crystal novel Indicator structure 555 so as to provide contrast between the solid black color of the template 528 or 625 and the colors reflected by the liquid crystal layer 550 through the clear portions of the template 637 as well as portions of the top layer 540 not containing any template 611, to the user so as to allow the "LOAD" message to be displayed to the user at predetermined temperatures. The message can be usually very simple and can also be intuitively interpreted by the end user, but could be replaced by any message listed in FIG. 6C (by way of example only, a message intended to covey an "action" or "positive" message).

More particularly and by way of example only, as shown in FIG. 6A in Row 620, the template 625 is colored black (and when visible, displays the message "LOAD"), and at 1° C. the color reflected by the Structure 555 is black 620*a* because the liquid crystal had not yet reached the Red Start temperature of 2° C. Thus, because the template 625 is colored black, it is not visible to the user and blends in with the black background of the Structure 555.

Then, as the Indicator reaches its Red Start temperature of about 2° C. the Structure 555 starts to display red 620*b* and the black template 625 starts to become visible because of the contrast between it and the red color reflected by the liquid crystal visible through the top layer 611. This is important because the contrast between the red of the liquid crystal layer 540 and the black ink of the template 625, indicates to the user that the Object being monitored by the novel Indicator or novel Indicator structure 555 is within the Packing Temperature Range, and as such the cooler system could be assembled and the Product can be safely placed within that assembled cooler system.

And as the temperature advances to about 2.3° C., the red 620*c* becomes more pronounced as does the black template 625, and that red color starts to turn slightly green 620*d* at about 2.8° C. As the temperature continues to rise, the red color turns much more green, and at about 3.0° C. the novel Indicator structure 555 turns green 620*e*, and the black template 625 becomes even more pronounced. At about 3.5° C. the green 620*f* becomes a true green, as the black template 625 becomes more pronounced. And as the temperature increases the color change continues until the blue start at about 4° C. wherein the Structure begins to turn blue 620*g*. Then as the novel Indicator structure 555 warms to about 5° C. the blue color becomes more evident (620*h*), and the black color of the template 625 begins to fade as it begins to blend in with the blue color.

The fact that the novel Indicator structure 555 is reaching 5° C. is important, because when the Structure reaches 5° C. it also means that the Object that the Indicator or Structure 55 is monitoring is starting to reach 5° C., and as such the Object is about to start moving outside of its Packing Temperature Range. Therefore, it is desired and important that the "LOAD" instruction contained on the template 625 begin to fade, so that the user is no longer instructed to pack the Product into the cooler system for all the reasons described herein. Using a black color for the template 625 is advantageous because as the Structure begins to warm further, for example to 6° C. 620*i* and then to 9° C. 620*k*, the template will better match the color reflected by the liquid crystal in the novel Indicator structure 555. This matching of the template 625 to the Structure when the Structure is outside of the Packing Temperature Range has the added advantage of reducing the Color Display Range of the Structure shown in FIG. 6A Row 620 from nine degrees Celsius (i.e., color reflected by the liquid crystal is visible from about 2° C. to about but not including 11° C. without the template 625), to approximately six degrees Celsius (i.e., color reflected by the liquid crystal is visible from about 2° C. to about but not including 8° C. with the template 625).

Similarly, a blue template (not shown) could be substituted for the black template 625 in Row 620, and in doing so good contrast is observed between the blue color of the template and the red and green colors displayed by the novel Indicator structure 555 at 2.3° C. and 3.5° C., respectively. The blue color of the template blends especially well with the blue and purple colors displayed by the Structure at 7.5° C. and 9° C., respectively; and thereby narrows the Color Display Range of the Structure by aiding in concealing the extended blue Color Range and the extended purple Color Range. However, when the temperature of the novel Indicator structure 555 is below the red start temperature (e.g., 1° C.) or above the end of the purple Color Range (e.g., 11° C.), the blue color of the template may not provide the sufficient blending of the blue template with the black color of the novel Indicator structure 555 at those temperatures, and thus can be somewhat visible.

In reference to FIG. 6A, another approach to using a template 625 to provide a message or indication that the Object is or is not at a desired temperature is to use a "take no action" or "negative" mask that conveys a message at temperature ranges different than those used in discussing the embodiments in Row 620 of FIG. 6A. In this embodiment, it assumed that the desired Packing Temperature Range is only one or two degrees Celsius and ranges from about 3.2° C. to about 3.8° C., and so as illustrated in Row 630 of FIG. 6A, the template purposely contrasts with the colors outside that desired Packing Temperature Range so as to warn the user when the Object is not within the desired Packing Temperature Range, while also blending in with the colors of the Structure and becoming less visible when the Structure (and the Object to which it is monitoring) are within the desired Packing Temperature Range. In this case, no message is revealed by the novel Indicator structure 555 when the novel Indicator structure 555 is within a portion of the temperature range of the Color Range for green, and a message is evident at all other temperature conditions. This approach is shown in FIG. 6A row 630 and is also very useful when the end user is not interested in operating within a very precise temperature range, but rather is interested to know if the temperature is within a certain broader temperature range. FIG. 6A row 630 is a representation in of the colors that an example liquid crystal novel Indicator structure 555 displays over a range of temperatures with a green mask 635 (also in grayscale) overlaid with a "NO" message. The message is usually very simple and is intuitively interpreted by the end user. Each panel in Row 630 is a combination of the template 635 laid over the top layer 611 of the novel Indicator structure 555, and is viewed by the used in a top down view is a representation of a color displayed by an example liquid crystal film at a specific temperature, wherein the interaction of the top layer 611 and the green template 635 contrast with each other at certain temperatures so as to display a "NO" message to the user.

For Row 630 illustrated in FIG. 6A, the formulation of the liquid crystal is slightly different, in that it has a Red Start temperature of about −1° C., and a red Color Range of about three degrees Celsius, thereby causing the liquid crystal novel Indicator structure 555 to reflect red through the top layer 540 of the novel Indicator structure 555, (which is the top layer 611 in all of FIG. 6A) in the range between about −1° C. and about 1° C. Similarly, the same liquid crystal novel Indicator structure 555 has a Green Start of about 2° C., and a Color Range of about three degrees Celsius thereby causing a green color in the range of about 2° C. to about 5° C.

It is contemplated that in the event the formulation for the red Color Range or the green Color Range does not last the entire desired width (e.g., in this example it is three degrees Celsius), a formulation that is the combination of more than one formulation is contemplated, each with slightly different Red Start and Green Start, so as to increase the red Color Range and the green Color Range to the desired width, The Blue Start of the blue color is at about 5° C. and because the blue has a Color Range of about ten and one-half degrees Celsius, the novel Indicator structure 555 is blue from about 5° C. to about 15.5° C. and will start turning from blue to purple at about 15.5° C. It should be noted that the transition from green to blue is not a sharp one, as the color blue contains many hues of green (i.e., the color blue contains many different wavelengths associated with the color green). Finally, the purple color has a Purple Start at about 15.5° C. with a Color Range of about ten and one-half degrees, and so the novel Indicator structure 555 is will be purple from about 15.5° C. until about 26° C., where it turns black.

More particularly, as shown in FIG. 6A in Row 630, the template 635 is colored green and because it contrasts with the black of the Indicator or Structure at about −2° C. 630*a* and at about 26° C. 630*l*, the message displayed by the template 635 ("NO") is very visible. As the Indicator or novel Indicator structure 555 reaches its Red Start temperature of about −1° C. the novel Indicator structure 555 starts to display red 630*b* but the green template 635 is still very visible. And as the temperature advances to about 0° C., the red 630*c* becomes more pronounced and the green template 635 starts to blend into the red color of the novel Indicator structure 555. As the temperature of the Indicator or Structure continues to rise, the red color starts to turn to slightly green 630*d* so that at about 1° C. the green template 635 is noticeably starting to blend with the reddish green color of the Structure.

Then at about 2.0° C. the novel Indicator structure 555 turns noticeably green 630*e*, and the green template 635 becomes even more blended with the top layer 611 of novel Indicator structure 555, and at this point the "negative" or "take no action" message of "NO" is not obviously visible to the user, and is preferably not visible at all. This is important because the lack of contrast between the green of the liquid crystal layer 540 and the green of the template 635, and thus the virtual disappearance of the "NO" message, indicates to the user that the Object being monitored by the Indicator or novel Indicator structure 555 is within the Packing Temperature Range, and as such the cooler system could be assembled and the Product can be safely placed within that assembled cooler system.

Turning back to FIG. 6A, at 3.0° C. the green 620*f* of the novel Indicator structure 555 is more intense and so continues to closely match the green template 635, so that the green template 635 continues to be almost completely blended away (and preferably completely blended away) and in so blending, almost totally obscures (and preferably completely obscures) the "NO" message of the template 635.

This blending and obscuring of the "NO" message (and thus the indication that the Object had reached its desired temperature) continues through about the 4.0° C. mark 630*g*, until the Blue Start occurs at about 5° C., wherein the novel Indicator structure 555 begins to turn blue 630*h*, and the green color of the template 635 begins to become visible again. The fact that the novel Indicator structure 555 is reaching about 5° C. is important because it also means that the Object to which the Structure is attached is starting to reach 5° C., and as such the Object is moving outside of its Packing Temperature Range. Therefore, it is desired and important that the "NO" instruction contained on the template 635 begin to become visible again, so that the user no longer believes that it is safe to pack the Product into the cooler system for all the reasons described herein.

Then as the Structure continues to warm further, for example to about 10.5° C. 630*i* and then to Purple Start of about 15.5° C. 630*j*, the green template 635 will better contrast with the blue 630*h* color reflected by the novel Indicator structure 555. Then even as the temperature of the novel Indicator structure 555 rises through the purple Color Range, for example to 21° C., the contrast between the template 635 and the top layer 611 of the novel Indicator structure 555 continues to increase 630*k*, and the contrast is evident when the purple Color Range ends at about 26° C., and the novel Indicator structure 555 turns black 610*l*. This contrast of the green template 635 to the colors reflected by the liquid crystal 540 of the Structure through the top layer 611 when the novel Indicator structure 555 is outside of the Packing Temperature Range has the added advantage of reducing the thinking required by the user to determine whether the temperature of the Object being monitored by the Indicator or novel Indicator structure 555 had moved outside the desired Packing Temperature Range, because that indication is accomplished only having to look for the point when the "negative" or "take no action" instruction is not visible.

The template 528 or 625 associated with Row 620 of FIG. 6A is made by printing (via inkjet printer, silkscreen, or other printing methods) a solid black ink onto a transparent film which becomes the top layer 540. The transparent film or top layer 540 containing the template 528 or 625 is laid on top of the liquid crystal 551, and so in effect the top layer 540 of the novel Indicator structure 555 is the template 528 or 625. It should be appreciated that although the ink comprising the template 528 or 625 could be placed on the side of the top layer 540 that faces (and thus interacts with) the liquid crystal 551, it is preferred that the ink comprising the template 528 or 625 be placed on the side of the top layer that is not facing the liquid crystal, so as to eliminate any detrimental effects from the ink of the template 528 or 625 interacting with the liquid crystal 551. Alternatively, the template 528 or 625 could be a separate layer of transparent film that is attached to the top layer 540 of the novel Indicator structure 555. By way of example only, patterns that comprise the template 528 or 625 may be printed on a commercially available cellulose acetate film with an inkjet printer. Typically, the template 528 or 625 is made by printing dark portions 625 (e.g., the letters of the message "LOAD") around completely clear portions 627 (the non-inked portions of the message "LOAD"). The clear portions or unmasked portions 627 of the transparent film or top layer 540 of the template 528 or 625 allow the colors of the underlying liquid crystal 550 interact with both the non-inked portions and the inked portions of the letters or symbols of the message (see FIG. 6C) so as to make up or convey the message formed by the visible letters or symbols (see FIG. 6C). Due to the contrast between the colors reflected by the liquid crystal 551 and the colors of the template 528 or 625 the letters or symbols comprising the message are revealed when the liquid crystal 550 changes to a color different than that of the black or blue color of the template 528 or 625. While row 620 in FIG. 6A shows the template 528 or 625 printed in black, that template 528 or 625 can be printed in a dark gray or blue or purple to provide contrast with the lighter red, green, and blue colored hues of the Liquid Crystal 550, while also blending in with the black, blue and purple colors of the Indicator or Structure (see 620*a* or 620*j* or 620*k* or 620*l*). Basically, in the case when a black template 528 or 625 is used, good contrast is observed between the template 528 or 625 and the colors displayed by the liquid crystal 550. However, one of ordinary skill will recognize that a different color could be used for the template 528 or 625, so long as the same results are achieved as discussed herein in regard to Row 620.

The template 528 or 635 associated with Row 630 of FIG. 6A is made by printing (via inkjet printer, silkscreen, or other printing methods) a solid green ink onto a transparent film, which becomes the top layer 540. The transparent film or top layer 540 containing the template 528 or 635 is laid on top of the liquid crystal 551 and so in effect the top layer 540 of the novel Indicator structure 555 is the template 528 or 635. It should be appreciated that although the ink comprising the template 528 625 could be placed on the side of the top layer 540 that faces (and thus interacts with) the liquid crystal 551, it is preferred that the ink comprising the template 528 or 625 be placed on the side of the top layer that is not facing the liquid crystal, so as to eliminate any detrimental effects from the ink of the template 528 or 625 interacting with the liquid crystal 551. Alternatively, the template 528 or 635 could be a separate layer of transparent film that is attached to the top layer 540 of the novel Indicator structure 555. By way of example only, patterns that comprise the template 528 or 635 may be printed on a commercially available cellulose acetate film with an inkjet printer. Typically, as shown in the example illustrated in FIG. 6A row 630, the template 528 or 635 is made by printing green portions 635 (e.g., the letters of the message "NO") around completely clear portions 637 (e.g., the non-inked portions of the message "NO"). The green portions of the transparent film or top layer 540 of the template 528 or 635 comprise the letters or symbols of the message (see FIG. 6D). The clear portions 637, or uninked portions 637, of the transparent film or top layer 540 of the template 528 or 635 allow the colors of the underlying liquid crystal 550 to interact with both the non-inked portions and the inked portions of the letters or symbols of the message (see FIG. 6D) so as to make up or convey the message formed by the visible letters of symbols (see FIG. 6D). Due to the contrast between the colors of the liquid crystal 551 and the green colors of the template 528 or 635, the letters or symbols printed in the template 528 or 635 and comprising the message (See FIG. 6D) are revealed as the liquid crystal 550 changes color different than that of the green color of the template 528 or 635 due to changing temperatures. While row 630 in FIG. 6A shows the template 528 or 635 printed in green, that template 528 or 635 can be printed in a red, a reddish green, or any other color that provides contrast with the darker black, blue and purple colored hues of the liquid crystal 550 (see 630*a* or 630*c* or 630*j* or 630*l*), while also blending in with the red and green colors of the Indicator or Structure (see 630*e* or 630*g*). Basically, in the case when a green template 528 or 635 is used, good contrast is observed between the template 528 or 635 and the colors displayed by the liquid crystal 550. However, one of ordinary skill will recognize that a different color could be used for the template 528 or 635, so long as the same results are achieved as discussed herein in regard to Row 630.

As described herein in regard to the Indicator or novel Indicator structure 555 depicted in FIG. 6A at 620, when a template 625 is created with a dark portion 625 surrounding completely clear portion(s) 627, good contrast is observed between the template 625 and the colors displayed by the liquid crystal 550. Due to the strong contrast, messages are revealed clearly. And as also described herein, the opposite but similar result can be achieved when the Indicator or Structure in FIG. 6A at 630 uses a reverse non-dark template 635 (e.g., a green color for the dark portion 635 and a clear portion 637). While contrast between the template 625 or 635 and the colors of the liquid crystal 550 contained in the novel Indicator or novel Indicator structure 555 is useful for many Indicator applications, that template-based solution illustrated in FIG. 6A poses problems when it is desired to reduce a color indication for a given Color Display Range to a truly narrow range of temperature (by way of example only, between two degrees Celsius and three degrees Celsius) or when only the elimination of a certain color is desired (e.g., eliminating red or blue). As described herein, the desired Packing Temperature Range described in regard to the novel Indicator or novel Indicator structure 555 discussed in FIG. 6A Row 620 for certain embodiments is very narrow in that it is just three degrees Celsius (e.g., 2° C. to 5° C.), and yet it still requires a temperature width of nine degrees Celsius to effectuate (e.g., a Red Start at 2° C. and purple end at 11° C.). The reason for this wide range of indication temperature is that, as discussed herein, the color blue and the color purple can persist for several degrees more than either the red or green colors.

To overcome the prior art disadvantages of wider than desired Color Display Range, and to overcome the limitations of the templates 625 and 635 taught herein in conjunction with FIG. 6A, the inventors have discovered, for example, that by using special color combinations in a mask and said colors being more transparent than the colors of the template embodiment, and due to said transparency when the mask is applied the mask is able to filter certain colors reflected by the thermochromic liquid crystal but not block all colors completely as a template would, the Color Display Range of a given Indicator or Structure can be narrowed significantly, even if the Color Display Range of that the liquid crystal is customarily wide. While a simple template comprising clear portions and solid colored portions (by way of example only, the template 625 in FIG. 6A comprised of dark ink portions 625 and clear portions 627 containing no ink) provides good contrast between the colors of the liquid crystal 551 and the template 625 throughout the most of the Color Display Range, the inventors have invented an improved template, referred to herein as a mask 675 (and illustrated in FIG. 6B), that provides good contrast so as to enable a message to be displayed to the user, but over a much narrower Color Display Range. Another distinguishing feature is that the colors when printed in the mask 675 transmit more light and are therefore more transparent compared to the opaque colors used in the template. This is achieved by applying a transparency factor to the opaque colors of the template of at least about 10% to 50% and preferably about 40%.

To achieve this inventive embodiment, as shown in FIG. 6B the mask 675 can have a first portion 676 that is created using a predetermined first color that is applied to a region of the top layer 540 of the novel Indicator structure 555, and is comprised of a second portion 677 that is created using a predetermined second color that is applied to a different region of the top layer 540 of the novel Indicator structure 555. The first portion 676 and the second portion 677 of the mask 675 are preferably colored in colors that are more transparent than the colors of the template embodiment, and due to said transparency when the mask is applied the mask is able to filter certain colors reflected by the thermochromic liquid crystal but not block all colors completely as a template would, so that when the first portion 676 and the second portion 677 of the mask 675 are applied to the their respective regions of the top layer 540 of the novel Indicator structure 555 they render the top layer 540 semi-transparent in regard to how the colors reflected by the liquid crystal 551 below that top layer 540 are viewed by the user. Thus, even though color in the form of the first portion 676 and the second portion 677 have been added to the top layer 540 positioned above liquid crystal layer 550, that previously clear portion of the top layer 540 remains semi-transparent and thereby allows certain of the colors reflected by the liquid crystal 551 to still be viewed by the user.

The colors of the first portion 676 and the second portion 677 of the mask 675 are at least 10% and up to 50% and preferably about 40% more transparent than the opaque colors used in the template. By way of example, a dark green that may be used in the template can be specified in graphics software, such as Adobe Illustrator, Microsoft Powerpoint or other graphics software packages by the command color coordinates of Red, Green and Blue (RGB) values of 65, 165, and 0 and a transparency value of 0%, respectively on a scale from 0 to 255 for the RGB and 0 to 100% on the transparency scale. This color, when sent to a digital printer such as an inkjet printer, laser printer or UV-curable ink printer and printed will be dark and opaque so as to block completely all colors reflected by the thermochromic liquid crystal and cannot be used in the mask 675 of certain embodiments of the invention. As one skilled in the art will recognize, a more transparent color when applied to a transparency will transmit more light compared to a darker color.

The inventors prepared a plurality of opaque colors varying in their command RGB coordinates and systematically evaluated the effect of the command transparency values on the colors reflected by the thermochromic liquid crystal composition. In this process, it was discovered that the transparency command sent to the printer in combination with the command RGB values plays a large role in the color filtering ability of a given printed mask. One of ordinary skill in the art understands that the transparency command on most digital software is a scale from 0 to 100 percent, wherein 0 percent represents the most intense color and 100 percent represents the absence of the color entirely. By using this process, the inventors discovered that the transparency value for a mask should, for certain embodiments, be set between 10% and up to 60% and most preferably between about 40% and 60%.

One skilled in the art will recognize that there are alternate manners to denote an increasingly transparent color. For instance, on the RGB scale, a more transparent color corresponds to higher values of the RGB coordinates. By way of example only, an RGB color with coordinates 65, 165 and 0 with a transparency of 40% can also be denoted by the new RGB coordinates of 160, 200, and 100 with a 0% transparency. Again, as one skilled in the art will recognize, these are two different ways to denote the same color.

In particular, by coloring the first portion 676 of the mask 675 a darker shade, and coloring the second portion 677 of the mask 675 a lighter shade, positioned on the top layer 540 of the novel Indicator structure 555, the contrast created by the first portion 676 and the second portion 677 when the liquid crystal 551 is reflecting a color in the red Color Range or in the green Color Range generates a message to the user that the Object is within its Packing Temperature Range (by way of example only, a first color background with a lighter colored checkmark or "√"). Moreover, by selecting a specific color for the first portion 676 of the mask 675 and selecting a specific color for the second portion 677 of the mask 675, these selected colors can effectively filter out most of both the blue Color Range and the purple Color Range; and as such the Color Display Range of the liquid crystal 551 can be greatly reduced.

In doing so, the template 625 or 635 of FIG. 6A (which may for example be a solid single colored structure that is comprised of a colored dark or inked portion 625 or 635 and a clear or ink-free portion 627 or 637), is replaced by the two-portion mask 675, which is comprised of a first color 676 replacing the darker colored or inked portion 625 or 635 of the template 625 or 635, and a second color 677 replacing the clear portion 627 or 637 of the template 625 or 635.

The key principle behind this other inventive embodiment is the subtractive color matching that occurs when a colored semi-transparent film is placed in front of a light source. In this case, the light source is the light that reflects off of the liquid crystal 550 in the Structure 555 or Indicator when it is within the Color Display Range and is reflecting a color to the user. Typically, ambient white light will pass through the semi-transparent two portion mask 675 to the liquid crystal layer 550, it then reflects off of the liquid crystal layer 550, and passes back through the semi-transparent two portion mask 675 to the observer (the end user). As the white light reflects off the liquid crystal layer 550, some of the wavelengths of light are absorbed and others are reflected back to the user. The wavelengths that are reflected back make up the red, green, blue and purple colors displayed by a typical liquid crystal layer 550. Importantly, when a colored filter is applied to the light reflecting off the liquid crystal layer 550, certain selected wavelengths of that reflected light can be filtered out or blocked, which effectively blocks a corresponding color from being viewed by the user of the novel Indicator structure 555 or Indicator. But for those wavelengths not blocked by the colored filter, the colors corresponding to those unblocked wavelengths will be viewed by the user of the novel Indicator structure 555 or Indicator.

By way of example only, a red filter may be used to absorb or block green reflected light, while simultaneously allowing red light and blue light wavelengths to be transmitted through and viewed by the user. In another example, a yellow filter may be used to absorb wavelengths of light corresponding to blue light and thereby block the color blue from being viewed by the user, while simultaneously allowing wavelengths of light corresponding to red light and green light to pass through and be viewed by the user. This light absorption behavior can be precisely determined by obtaining a light absorption spectrum for the filter. Similarly, the light absorption behavior can be empirically determined by creating filters of various shades and observing their effect on the light reflected out of the liquid crystal layer 550.

For the purposes of altering or blocking certain wavelengths of light reflected out of the liquid crystal layer 550 and so as to be blocked from the view of the user, by manufacturing a mask 675 that has a yellow filter in the second portion 677 and that second portion 677 covers at least a region of the liquid crystal layer 550, when the blue light is reflected off of the liquid crystal layer 550 at a given temperature the yellow filter in the second portion 677 of the mask 675 will block most of that blue color from the view of the user. In this way, the liquid crystal layer's 550 Color Display Range will be narrowed because the blue Color Range will have been mostly blocked from the view of the user by the yellow filter in the second portion 677 of the mask 675. Moreover, the yellow filter in the second portion 677 of the mask 675 will also aid in mostly blocking the wavelengths associated with the color purple. Thus, the yellow filter in the second portion 677 of the mask 675 will have aided in narrowing the Color Display Range by partially, if not fully blocking at least the reflected blue Color Range and the purple Color Range.

Perhaps just as important, the yellow filter in the second portion 677 of the mask 675 in certain embodiments will not fully block and instead allows most of the red color in the red Color Range to partially pass through the top layer 540 and be viewed by the user, although the red color will appear more like a light red or even a yellowish red. Similarly, the yellow filter in the second portion 677 of the mask 675 will not block and instead allows the green color to pass through and appear light green to yellowish green to the user. Thus, this allows for a narrowing of the Color Display Range while still allowing the colors important to the user (e.g., red and green) to be seen.

The first portion 676 of the mask 675 can also be colored so as to aid in the narrowing of the Color Display Range by at least partially blocking certain colors from being observed by the user. By way of example only by manufacturing a mask 675 that has a green filter in the first portion 676, and that first portion 676 covers at least a region of the liquid crystal layer 550, so that when the blue light is reflected off of the liquid crystal layer 550 at a given temperature, the green filter in the first portion 676 of the mask 675 will filter out most and preferably all of the blue wavelengths. In this way, the liquid crystal layer's 550 Color Display Range will be narrowed because the blue Color Range will have been at least partially filtered out by the green colored filter positioned in the first portion 676 of the mask 675 and will at least partially block the blue Color Range from the view of the user. Moreover, the green filter in the first portion 676 of the mask 675 will also aid in at least partially blocking the wavelengths associated with the color purple. Thus, the green filter in the first portion 676 of the mask 675 will have aided in narrowing the Color Display Range by partially, and preferably fully blocking at least the reflected blue Color Range and the purple Color Range.

Perhaps just as important, the green filter in the first portion 676 of the mask 675 in certain embodiments will not fully block and instead allows most of the red color in the red Color Range to pass through the top layer 540 and be viewed by the user, although the red color will appear more like a dark greenish red color than a true red color. Similarly, the green filter in the first portion 676 of the mask 675 will not fully block and instead will mostly allow the green color to pass through and appear green to the user, and more specifically will appear a slightly darker when compared to the green passed through by the yellow colored second portion 677 of the mask 675. Thus, this green filter in the first portion 676 of the mask 675 allows for a narrowing of the Color Display Range by mostly blocking the blue Color Range and purple Color Range while still allowing the colors important to the user (e.g., red and green) to be seen.

In reference to FIG. 6B, and more particularly to Row 670, in order to narrow the Color Display Range of a given liquid crystal in a novel Indicator structure 555 or Indicator, a mask 675 comprised of a first portion 676 and a second portion 677 may be applied to at least a portion of the top layer 540 of the novel Indicator structure 555 so as to reveal a message to the user only when the temperature of the liquid crystal 550 is in the red Color Range and/or in the green Color Range Play (thereby narrowing the Color Display Range to just the desired Packing Temperature Range).

FIG. 6B illustrates how the first portion 676 and the second portion 677 of the mask 675 narrow the Color Display Range of the Indicator or novel Indicator structure 555 by reducing if not eliminating the blue Color Range and the purple Color Range from view by the user. By way of example only, FIG. 6B shows the mask 675 colored yellow in the second portion 677 and green in the first portion 676. When that mask 675 is applied to the novel Indicator structure 555 and the novel Indicator structure 555 is at about 1° C. or less, the message (in the form of the second portion 677 shaped like a "check mark" or "√" combined with the first portion 676 that forms the "check mark" or "√") can not be viewed by the user because the liquid crystal layer 550 is not reflecting any color 670*a* and thus the novel Indicator structure 555 appears black.

Once the Red Start is reached at about 2° C. the color red 670*b* becomes visible in the first portion 676 of the mask 675 because the green filter that is the first portion 676 allows the red wavelengths to pass through to be viewed by the user (although the red Color Range is more of a greenish red color). Simultaneously, the second portion 677 of the mask, which is colored yellow, appears a lighter yellowish red color because the yellow filter is allowing the red wavelengths to pass through. This is important because the contrast between the darker greenish red color of the first portion 676 and the lighter yellowish red of the "√" that is the second portion 677 of the mask 675, indicates to the user that the Object being monitored by the novel Indicator or novel Indicator structure 555 is within the Packing Temperature Range, and as such the cooler system could be assembled and the Product can be safely placed within that assembled cooler system.

The liquid crystal layer 550 continues through the red Color Range, wherein the temperature of about 2.3° C. results in a redder color in the first portion 676 of the mask 675 and still a lighter yellowish red color in the second portion 677 of the mask 675, 670*c*, wherein this contrast in colors allows the user to continue to view the message (in this example the "√") so that the user knows that the Object is at the desired temperature (e.g., continues to be within the Packing Temperature Range). The same is true as the temperature of the liquid crystal 540 moves to about 2.8° C., because the first portion 676 of the mask 675 starts turning a greenish red while the second portion 677 of the mask 675 670*d* remains a lighter yellowish red color, thereby continuing to provide the contrast so that the user can continue to be view the message (e.g., in the form of a "√").

As the liquid crystal layer 550 continues to warm to about 3° C. the Green Start is reached 670*e*, and the first portion 676 of the mask turns a dark green while the second portion 677 of the mask 675 turns a lighter green. However, the contrast of these two green colors still provides a noticeable distinction so as to continue to allow the message (in the form of the "√") to be visible to the user. This contrast between the darker green of the first portion 676 of the mask 675 and the lighter green of the second portion 677 of the mask 675 continues even as the temperature of the liquid crystal layer 540 reaches about 3.5° C. 670*f*. This contrast visible at 3.5° C. still indicates to the user (in a message in the form of the "√") that the Object is still within the Packing Temperature Range, and therefore it is still safe to assemble the cooler system and pack the temperature sensitive product into that cooler system.

Then as the temperature of the liquid crystal layer 540 reaches about 4.0° C. 670*g* the Blue Start temperature is reached, and the second portion 677 of the mask 675 starts to turn a light blue because the filtering effect achieved by the yellow color filter of that second portion 677 partially blocks the blue wavelengths being reflected from the liquid crystal layer 540 from being viewed by the user, although the second portion 677 of the mask 675 does allow the green wavelengths present in the blue color to pass through, as well as allows the early blue wavelengths to pass through, thereby generating the lightness of visible in the second portion 677 of the mask 675. Similarly, the green coloring of the first portion 676 begins to filter and block the blue wavelengths being reflected from the liquid crystal layer 540 from being viewed by the user, although the first portion 676 of the mask 675 does allow the green wavelengths present in the blue color to pass through, as well as allows the early blue wavelengths to pass through, thereby generating the darker green blue visible at about 4° C. in the first portion 676 of the mask 675.

Then as the temperature of the liquid crystal layer 540 reaches about 5.0° C. 670*h* the green wavelengths are mostly absent from the blue color, and so the second portion 677 of the mask 675 starts to turn a darker blue because the filtering effect achieved by the yellow color filter of that second portion 677 is blocking most of the blue wavelengths being reflected from the liquid crystal layer 540 from being viewed by the user. Similarly, the green coloring of the first portion 676 continues to filter and block even a greater amount of the blue wavelengths being reflected from the liquid crystal layer 540 from being viewed by the user. Thus, at about 5° C. the entire top layer 540 of the novel Indicator structure 555 appears very dark blue to almost black, because the message (which in this example is in the form of a checkmark or "√") is mostly if not totally obscured and is not visible to the user.

The fact that the novel Indicator structure 555 is reaching 5° C. and that the message (which in this example is in the form of a checkmark or "√") is no longer visible by the user is important, because when the novel Indicator structure 555 reaches about 5° C. it also means that the Object to which the Structure is attached is starting to reach about 5° C., and as such the Object is moving outside of its Packing Temperature Range. Therefore, it is desired and important that the message conveyed by the mask 675 (in this exemplary example, the "√") begin to fade at this point, so that the user is no longer informed that the Object is within the Packing Temperature Range, and therefore the Product should, for certain embodiments, not be packed into the cooler system for all the reasons described herein.

And as the liquid crystal layer 540 continues to warm to about 6° C. 670*i* the liquid crystal turns a deeper blue; which results in more of the blue wavelengths being blocked by both the yellow filter in the second portion 677 and the green filter in the first portion 676 of the mask 675. This trend continues through the Purple Start at 7.5° C. 675*j* through the end of the purple Color Range at about 9.0° C. 670*k*, in that the purple color, like the blue color, is blocked by the yellow colored filter that is the second portion 677 of the mask 675, and is blocked by the green colored filter that is the first portion 676 of the mask 675. And as such the message conveyed by the mask 675 (in this exemplary example, the "√") is still not visible to the user of the Indicator or novel Indicator structure 555, and as such the user is not misled into believing that the Object is within the Packing Temperature Range. Finally, the liquid crystal layer 540 reaches 11° C. 670*l* and moves out of the Color Display Range for the novel Indicator structure 555 (which is by way of example only, 2.0° C. to 11.0 C), and no color is reflected by the liquid crystal layer 540. Given there is no reflected light from the liquid crystal 551, there no message conveyed by the mask 675 (in this exemplary example, the "√") to the user of the novel Indicator or novel Indicator structure 555, and as such the user knows the Object is not within the Packing Temperature Range.

This blocking of the blue Color Range and the blocking of the purple Color Range by the mask 675 has the consequential advantage of narrowing the Color Display Range for the novel Indicator or novel Indicator structure 555 to approximately three degrees Celsius from what would have otherwise been a nine degrees Celsius Color Display Range. This greatly reduced Color Display Range allows for non-confusing indications and messages to be displayed to the user, while simultaneously reducing the number of formulations needed to indicate when the Object was within it Packing Temperature Range to, for example, just a single formulation. The mask 675 can be made by printing (via inkjet printer, silkscreen, or other printing methods) two colors onto separate regions of the top layer 540. The second portion 677 of the mask 675 is a first color, and can be lighter in comparison to the first portion 676 of the mask 675, which can be a much darker color by comparison. The lighter color of the second portion 677 can be structured so as to be in the form of a symbol(s), letter(s) or glyphs that convey the desired message to the user. The darker color of the first portion 676 makes up the background of the mask 675 and contrasts with the color of the second portion 677 so as to aid in forming the message. The mask 675 may be printed on a commercially available cellulose acetate film with an inkjet printer, and preferably will use a 5 mil polyester Mylar film. One good combination of light and dark colors that successfully blocks the blue and purple colors from being displayed is a yellow checkmark in the second portion 677 (i.e., the light region) on a green background in the first portion 676 (i.e., the dark region), although one of ordinary skill in the art will realize that other combinations can be used to at least partially and preferably completely block certain other colors reflected by the liquid crystal layer 540.

It should be noted that the colors described herein may vary depending upon a specific computer and printer combination, as it can be very difficult to precisely match on-screen colors to printed colors in general. On the RGB color scale and in regard to the mask 675, the second portion 677, which can be in the form of a checkmark, is colored yellow with very high and roughly equal red and green values and an intermediate value of blue. For example, a preferred yellow is R=255, G=255, and B=150. The colors of the second portion 677 of the mask 675 should be at least 10% and up to 50% and preferably about 40% more transparent than the opaque colors used in the template. By way of example, a vivid yellow that may be used in the template can be specified in graphics software such as Adobe Illustrator, Microsoft Powerpoint or other graphics software packages by the command color coordinates of Red, Green and Blue (RGB) values of 255, 255, and 0 and a transparency value of 0%, respectively on a scale from 0 to 255 for the RGB and 0 to 100% on the transparency scale. This color, when sent to a digital printer such as an inkjet printer, laser printer or UV-curable ink printer and printed will be opaque so as to block completely all colors reflected by the thermochromic liquid crystal and cannot be used in the mask 675 of the invention. As one skilled in the art will recognize, a more transparent color when applied to a transparency will transmit more light compared to a darker color.

The inventors prepared a plurality of opaque colors varying in their command RGB coordinates and systematically evaluated the effect of the command transparency values on the colors reflected by the thermochromic liquid crystal composition. In this process, it was discovered that the transparency command sent to the printer in combination with the command RGB values plays a large role in the color filtering ability of a given printed mask. One of ordinary skill in the art understands that the transparency command on most digital software is a scale from 0 to 100 percent, wherein 0 percent represents the most intense color and 100 percent represents the absence of the color entirely. By using this process, the inventors discovered that the transparency value for a mask should, for certain embodiments, be set between 10% and up to 60% and most preferably between about 40% and 60%.

One skilled in the art will recognize that there are alternate manners to denote a increasingly transparent color. For instance, on the RGB scale, a more transparent color corresponds to higher values of the RGB coordinates. By way of example only, an RGB color with coordinates 255, 255, and 0 with a transparency of 60% can also be denoted by the new RGB coordinates of 255, 255, and 150 with a 0% transparency. Again, as one skilled in the art will recognize, these are two different ways to denote the same color. The color with RGB coordinates 255, 255, and 150 most closely resembles Pantone 461C. However, the RGB blue value may range from 70-200 and still preserve a yellow color useful for blocking out the blue Color Range and the purple Color Range.

The colors applied to the to the second portion 677 can be applied using digital processes such as inkjet, laser, or UV-curable ink processes or screen printing processes. If applied using UV-curable inks, the printing is performed on an Océ Variadot Arizona 480 GT flat bed printer manufactured by Canon. The printer prints with a resolution of 1440×1440 dots per inch (DPI).

With regard to the color specifications of the dark background of the first portion 676 of the mask 675 of FIG. 6B, it can be a green with a dominant RGB green value, an intermediate RGB red value, and an intermediate to low RGB blue value. For example, a preferable green is R=150, G=200, and B=100. The colors of the first portion 676 of the mask 675 is at least 10% and up to 50% and preferably about 40% more transparent than the opaque colors used in the template. By way of example, a vivid and opaque green that may be used in the template can be specified in graphics software such as Adobe Illustrator, Microsoft Powerpoint or other graphics software packages by the command color coordinates of Red, Green and Blue (RGB) values of 65, 165 and 0 and a transparency value of 0%, respectively on a scale from 0 to 255 for the RGB and 0 to 100% on the transparency scale. This color, when sent to a digital printer such as an inkjet printer, laser printer or UV-curable ink printer and printed will be opaque so as to block all colors reflected by the thermochromic liquid crystal and may not be used in the mask 675 of the invention. As one skilled in the art will recognize, a more transparent color when applied to a transparency can transmit more light compared to a darker color.

The inventors prepared a plurality of opaque colors varying in their command RGB coordinates and systematically evaluated the effect of the command transparency values on the colors reflected by the thermochromic liquid crystal composition. In this process, it was discovered that the transparency command sent to the printer in combination with the command RGB values plays a role in the color filtering ability of a given printed mask. One of ordinary skill in the art understands that the transparency command on digital software is a scale from 0 to 100 percent, wherein 0 percent represents the most intense color and 100 percent represents the absence of the color entirely. By using this process, the inventors discovered that the transparency value for a mask could, for certain embodiments, be set between 10% and up to 60% and most preferably between about 40% and 60%.

One skilled in the art will recognize that there are alternate manners to denote a increasingly transparent color. For instance, on the RGB scale, a more transparent color corresponds to higher values of the RGB coordinates. By way of example only, an RGB color with coordinates 65, 165 and 0 with a transparency of 40% can also be denoted by the new RGB coordinates of 160, 200 and 100 with a 0% transparency. Again, as one skilled in the art will recognize, these are two different ways to denote the same color. The color with RGB coordinates 160, 200, and 100 closely resembles Pantone 367C. The RGB values may range slightly for each color. For example, the red value should, for certain embodiments, range from about 145-175, the green value from 190-210, and the blue value from 80-120.

The colors applied to the to the second portion 677 can be applied using digital processes such as inkjet, laser, or UV-curable ink processes or screen printing processes. If applied using UV-curable inks, the printing can be performed on an Océ Variadot Arizona 480 GT flat bed printer manufactured by Canon. That printer prints with a resolution of 1440×1440 dots per inch (DPI).

One of ordinary skill in the art will recognize that many other combinations of colors can be used in conjunction with the first portion 676 of the mask 675 and the second portion 677 of the mask 675 so as to block other colors (such as the red or green colors) reflected by the thermochromic liquid crystal 551.

An alternative to the two portion mask 675 embodiment is an embodiment that uses a single portion, as shown in FIG. 6E. To achieve this inventive embodiment, the mask 685 depicted in FIG. 6E is comprised of a single first portion 685 that is created using a predetermined first color that is applied to most if not all of a region of the top layer 540 of the novel Indicator structure 555. This single portion mask 685 is preferably applied using a half-tone printing process, so that when the colored filter of the single portion mask 685 is applied to its respective region of the top layer 540 of the novel Indicator structure 555 it renders the top layer 540 semi-transparent in regard to how the colors reflected by the liquid crystal 551 below that top layer 540 are viewed by the user. Thus, even though color in the form of the single portion mask 685 have been added to the top layer 540 positioned above liquid crystal layer 550, that previously clear portion of the top layer 540 remains semi-transparent and thereby allows certain of the colors reflected by the liquid crystal 551 to still be viewed by the user.

In particular, by coloring the single portion mask 685 a certain shade, by way of example only a green color, when the liquid crystal 551 reflects a color in the red Color Range or in the green Color Range a message in the form of a reddish or green color will be displayed to the user so as to indicate to the user that the Object is within its Packing Temperature Range (by way of example only, a red color or a green color), because by selecting a specific color for the single portion mask 685, the green colored filter can effectively block or filter out most of both the blue Color Range and the purple Color Range; and as such the Color Display Range of the liquid crystal 551 can be greatly reduced.

For the purposes of filtering or altering or blocking certain wavelengths of light reflected out of the liquid crystal layer 550 and so as to be blocked from the view of the user, by manufacturing the single portion mask 685 to be colored so as to aid in the narrowing of the Color Display Range by at least partially blocking certain colors from being observed by the user. By way of example only by manufacturing a mask 685 that has a green filter in the single portion mask 685, and that single portion mask covers at least a region of the liquid crystal layer 550, so that when the blue light is reflected off of the liquid crystal layer 550 at a given temperature, the green filter in the single portion mask 685 will filter out most and preferably all of the blue wavelengths. In this way, the liquid crystal layer's 550 Color Display Range will be narrowed because the blue Color Range will have been at least partially filtered out by the green colored filter of the single portion mask 685 and will at least partially block the blue Color Range from the view of the user. Moreover, the green filter in the single portion mask 685 will also aid in at least partially blocking the wavelengths associated with the color purple. Thus, the green filter in the single portion mask 685 will have aided in narrowing the Color Display Range by partially, and preferably fully blocking at least the reflected blue Color Range and the purple Color Range.

Perhaps just as important, the green filter in the single portion mask 685 will not fully block and instead allows the red color in the red Color Range to pass through the top layer 540 and be viewed by the user, although the red color will appear more like a greenish red color than a true red color. Similarly, the green filter in the single portion mask 685 will not fully block and instead will allow, at least in part the green color to pass through and appear green to the user. Thus, this green filter in the single portion mask 685 allows for a narrowing of the Color Display Range by blocking, at least in part the blue Color Range and purple Color Range while still allowing the colors important to the user (e.g., red and green) to be seen.

In reference to FIG. 6E, and more particularly to Row 690, in order to narrow the Color Display Range of a given liquid crystal in a novel Indicator or novel Indicator structure 555, a single portion mask 685 comprised of the single mask 685 may be applied to at least a portion of the top layer 540 of the novel Indicator structure 555 so as to reveal a message to the user only when the temperature of the liquid crystal 550 is in the red Color Range and/or in the green Color Range Play (thereby narrowing the Color Display Range to just the desired Packing Temperature Range).

FIG. 6B illustrates how the single portion mask 685 narrows the Color Display Range of the novel Indicator or novel Indicator structure 555 by reducing if not eliminating the blue Color Range and the purple Color Range from view by the user. By way of example only, FIG. 6E shows the single portion mask 685 colored green. When that single portion mask 685 is applied to the novel Indicator structure 555 and the novel Indicator structure 555 is at about 1° C. or less, the message (by way of example only would be in the form of a reddish or green color) can not be viewed by the user because the liquid crystal layer 550 is not reflecting any color 680a and thus the novel Indicator structure 555 appears black.

Once the Red Start is reached at about 2° C. the color red 680b becomes visible in the single portion mask 685 because the green filter allows the red wavelengths to pass through to be viewed by the user (although the red Color Range is more of a greenish red color). This is important because the message or indication in the form of a greenish red color, indicates to the user that the Object being monitored by the novel Indicator or novel Indicator structure 555 is within the Packing Temperature Range, and as such the cooler system could be assembled and the Product can be safely placed within that assembled cooler system.

The liquid crystal layer 550 continues through the red Color Range, wherein the temperature of about 2.3° C. results in a redder color in the single portion mask 685 670*c* that allows the user to continue to view the message (in this example the greenish red color) so that the user knows that the Object is at the desired temperature (e.g., continues to be within the Packing Temperature Range). The same is true as the temperature of the liquid crystal 540 moves to about 2.8° C., because the single portion mask 685 starts turning a more greenish red, thereby continuing to provide the message or indication so that the user can continue to be view the message (e.g., in the form of a "√").

As the liquid crystal layer 550 continues to warm to about 3° C. the Green Start is reached 680*e*, and the single portion mask 685 turns a dark green. However, that green color still provides a noticeable indication so as to continue to allow the message (in the form of the green color) to be visible to the user. This green color indication or message displayed by the single portion mask 685 of the novel Indicator structure 555 or Indicator continues even as the temperature of the liquid crystal layer 540 reaches about 3.5° C. 670*f*. This indication visible at 3.5° C. still indicates to the user (in a message in the form of the green color) that the Object is still within the Packing Temperature Range, and therefore it is still safe to assemble the cooler system and pack the temperature sensitive product into that cooler system.

Then as the temperature of the liquid crystal layer 540 reaches about 4.0° C. 670*g* the Blue Start temperature is reached, and the single portion mask 685 starts to turn a light blue because the filtering effect achieved by green color filter of that single portion mask 685 partially blocks the blue wavelengths being reflected from the liquid crystal layer 540 from being viewed by the user. Similarly, the green coloring of the single portion mask 685 begins to filter and block the blue wavelengths being reflected from the liquid crystal layer 540 from being viewed by the user although it does allow the green wavelengths present in the blue color to pass through, as well as allows the early blue wavelengths to pass through, thereby generating the greenish blue visible at about 4° C. in the single portion mask 685.

Then as the temperature of the liquid crystal layer 540 reaches about 5.0° C. 680*h* the green wavelengths are mostly absent from the blue color, and so the single portion mask 685 starts to turn a darker blue because the filtering effect achieved by the green color filter of that single portion mask 685 is blocking most of the blue wavelengths being reflected from the liquid crystal layer 540 from being viewed by the user. Thus, at about 5° C. the entire top layer 540 of the novel Indicator structure 555 appears very dark blue to almost black, because the message (which in this example is in the form of a red or green color) is mostly if not totally obscured and is not visible to the user.

The fact that the novel Indicator structure 555 in certain embodiments is reaching 5° C. and that the message (which in this example is in the form of a red or green color) is no longer visible by the user is important, because when the novel Indicator structure 555 reaches about 5° C. it also means that the Object to which the Structure is attached is starting to reach about 5° C., and as such the Object is moving outside of its Packing Temperature Range. Therefore, it is desirable that the message conveyed by the single portion mask 685 (in this exemplary example, the red or green color) in certain embodiments begin to fade at this point, so that the user is no longer informed that the Object is within the Packing Temperature Range, and therefore the Product should, in certain embodiments not be packed into the cooler system for all the reasons described herein.

And as the liquid crystal layer 540 continues to warm to about 6° C. 680*i* the liquid crystal turns a deeper blue; which results in more of the blue wavelengths being blocked by the single portion mask 685. This trend continues through the Purple Start at 7.5° C. 685*j* through the end of the purple Color Range at about 9.0° C. 680*k*, in that the purple color, like the blue color, is blocked by the green colored filter that is the single portion mask 685. And as such the message conveyed by the single portion mask 685 (in this exemplary example, the red or green color) is still not visible to the user of the Indicator or novel Indicator structure 555, and as such the user is not misled into believing that the Object is within the Packing Temperature Range. Finally, the liquid crystal layer 540 reaches 11° C. 680*l* and moves out of the Color Display Range for the novel Indicator structure 555 (which is by way of example only, 2.0° C. to 11.0 C), and no color is reflected by the liquid crystal layer 540. Given there is no reflected light from the liquid crystal 551, there no message conveyed by the single portion mask 685 (in this exemplary example, the red or green color) to the user of the novel Indicator or novel Indicator structure 555, and as such the user knows the Object is not within the Packing Temperature Range.

This blocking of the blue Color Range and the blocking of the purple Color Range in certain embodiments has by the single portion mask 685 the consequential advantage of narrowing the Color Display Range for the novel Indicator structure 555 or Indicator to approximately three degrees Celsius from what would have otherwise been a nine degrees Celsius Color Display Range. This greatly reduced Color Display Range allows for non-confusing indications and messages to be displayed to the user, while simultaneously reducing the number of formulations needed to indicate when the Object was within it Packing Temperature Range to, for example, just a single formulation.

One of ordinary skill in the art will know that although a green color was used as the colored filter in the single portion mask 685 embodiment described herein, a colored filter of a color other than green could also be used.

The single portion mask 685 can be made by using a colored filter made of acetate sheet or similar material that is colored to the required shade of green or whatever color is required. Alternatively, the single portion mask 685 can be made by printing the green color onto the top layer 540 as described herein. Similarly, the two portion mask 675 can be made by using multiple colored filters formed on a single acetate sheet that contains the coloring to the required shades, such green and yellow, or whatever colors are required to accomplish the filtering and or blocking of the desired wavelengths. Or the two portion mask 675 can be made by using multiple colored filters formed on separate acetate sheets that contain the coloring to the required shades, such green and yellow, or whatever colors are required to accomplish the filtering and or blocking of the desired wavelengths, and the colored portions are then joined to form the mask 675.

Figure 7A:
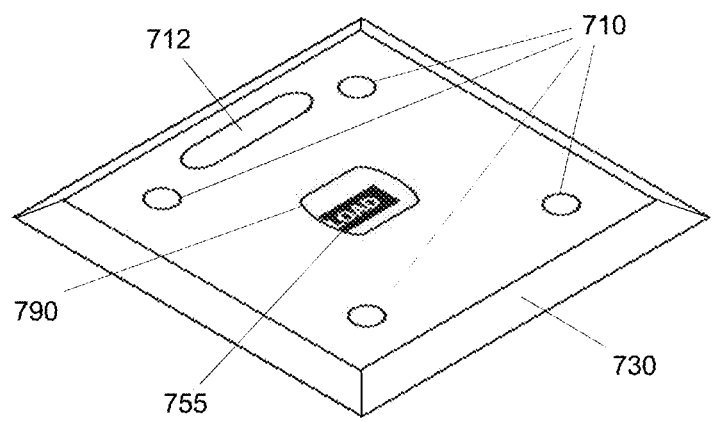
FIG. 7A is a top side view of a new embodiment of the PCM-filled panel containing the inventive thermochromic liquid crystal strip or Indicator.
Figure 7B:
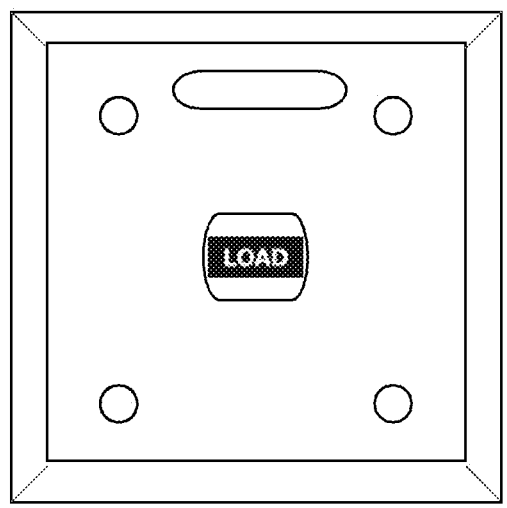
FIG. 7B is a top view of a new embodiment of the PCM-filled panel containing the inventive thermochromic liquid crystal strip or Indicator.

As shown in FIG. 7A and FIG. 7B, by increasing the side of the indentions 710 to resemble the large indentation 790, the user experience can be enhanced because the message 755 can be more easily read.

Figure 8:
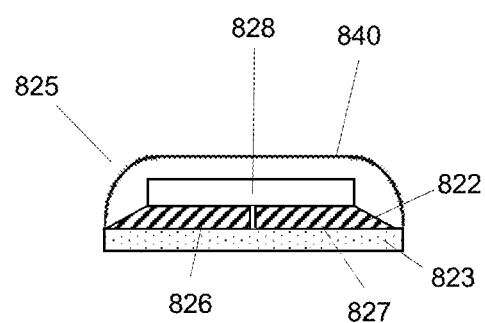
FIG. 8 is a side cross-sectional view of the inventive thermochromic liquid crystal strip or Indicator containing a film that possesses or provides improved viewing angle capabilities.

As shown in FIG. 8, the optic 480 from FIG. 4A and FIG. 4B can be replaced by a viewing angle film 840, and used for the same purpose of increasing the visual size of the message being displayed to the user by the liquid crystal layer 540 when used in conjunction with the templates 625 and 635 or the mask 675 described herein.

Although the inventions contained herein have been particularly shown and described with reference to preferred and alternative embodiments thereof, it will be understood by those skilled in the art that various changes in form and detail may be made to those inventions without departing from the spirit and scope of the inventions.

What is claimed is:

1. A temperature Indicator comprising:
a liquid crystal structure comprising:
a top layer;
a backing layer;
a single compartment positioned between said top layer and said backing layer containing temperature sensitive liquid crystals configured to indicate a temperature; and
a mask comprised of a color filter positioned on said top layer,
wherein said mask includes at least a first mask portion and a second mask portion,
wherein said first mask portion is configured to:
filter out at least a portion of a first color of light from passing through said first mask portion,
allow at least a portion of a second color of light to pass through said first mask portion, and
filter out at least a portion of a third color of light from passing through said first mask portion;
wherein said second mask portion is configured to:
filter out at least a portion of the first color of light from passing through said second mask portion,
filter out at least a portion of the second color of light from passing through said second mask portion, and
allow at least a portion of the third color of light to pass through said second mask portion; and
wherein an amount of light formed by at least one of said first color of light, said second color of light, and said third color of light passing through said first mask portion is in contrast with another amount of light formed by least one of said first color of light, said second color of light, and said third color of light passing through said second mask portion.

2. The temperature Indicator of claim 1, wherein said top layer that is exposed to the ambient air possesses thermal insulative properties.

3. The temperature Indicator of claim 1, wherein said backing layer that is in thermal contact with an object being monitored possesses thermal conductive properties.

4. The temperature Indicator of claim 1, wherein said single liquid crystal compartment contains a dopant to retard the transition speed of said temperature sensitive liquid crystals.

5. The temperature Indicator of claim 1, wherein said mask is positioned on the upper side of said top layer.

6. The temperature Indicator of claim 1, wherein said single liquid crystal compartment contains a single liquid crystal formulation.

7. The temperature Indicator of claim 1, wherein said single liquid crystal compartment contains at least two liquid crystal formulations.

8. The temperature Indicator of claim 1, further comprising:
a magnifying optic.

9. The temperature Indicator of claim 1, further comprising:
a viewing angle film.

10. The temperature Indicator of claim 1, wherein at a temperature said amount of light being in contrast with said other amount of light displays a message.

11. The temperature Indicator of claim 1, wherein said first mask portion is semitransparent and colored a first color, and wherein said second mask portion is semitransparent and colored a second color.

12. The temperature Indicator of claim 1 wherein said first mask portion is further configured to filter out at least a portion of a fourth color of light from passing through said first mask portion, and
wherein said second mask portion is further configured to filter out at least a portion of said fourth color of light from passing through said second mask portion.

13. The temperature Indicator of claim 12, wherein the amount of light formed by said at least one of said first color of light, said second color of light, said third color of light, and said fourth color of light passing through said first mask portion is in contrast with said other amount of light formed by said at least one of said first color of light, said second color of light, said third color of light, and said fourth color of light passing through said second mask portion.

14. The temperature Indicator of claim 1, wherein at a temperature, said first mask portion is further configured to filter out at least a portion of said second color of light.

15. The temperature Indicator of claim 1, wherein at a temperature, said first mask portion is further configured to filter out at least a portion of said third color of light.

16. The temperature Indicator of claim 1, wherein at a temperature, said second mask portion is further configured to filter out at least a portion of said second color of light.

17. The temperature Indicator of claim 1, wherein at a temperature, said second mask portion is further configured to filter out at least a portion of said third color of light.

18. A temperature Indicator, comprising:
a liquid crystal structure, the liquid crystal comprising:
a top layer;
a backing layer;
a single compartment positioned between said top layer and said backing layer containing temperature sensitive liquid crystals configured to indicate a temperature;
a mask comprised of a color filter positioned on said top layer; and
a cap or a housing,
wherein said mask includes at least a first mask portion and a second mask portion,
wherein said first mask portion is configured to:
filter out at least a portion of a first color of light from passing through said first mask portion,
allow at least a portion of a second color of light to pass through said first mask portion, and
filter out at least a portion of a third color of light from passing through said first mask portion;
wherein said second mask portion is configured to:
filter out at least a portion of the first color of light from passing through said second mask portion,
filter out at least a portion of the second color of light from passing through said second mask portion, and
allow at least a portion of the third color of light to pass through said second mask portion; and
wherein an amount of light formed by at least one of said first color of light, said second color of light, and said third color of light passing through said first mask portion is in contrast with another amount of light formed by least one of said first color of light, said second color of light, and said third color of light passing through said second mask portion.

19. The temperature Indicator of claim 18, wherein said top layer that is exposed to the ambient air possesses thermal insulative properties.

20. The temperature Indicator of claim 18, wherein said backing layer that is in thermal contact with an object being monitored possesses thermal conductive properties.

21. The temperature Indicator of claim 18, wherein said single liquid crystal compartment contains a dopant to retard the transition speed of said temperature sensitive liquid crystals.

22. The temperature Indicator of claim 18, wherein said mask is positioned on the upper side of said top layer.

23. The temperature Indicator of claim 18, wherein said first mask portion is further configured to filter out:
   a significant amount of the red wavelengths that are reflected by said temperature sensitive liquid crystals contained in said liquid crystal compartment so as to significantly reduce the red color in the purple spectrum of the purple Color Range displayed by said Indicator, thereby resulting in a reduction in the width of a Color Display Range of said Indicator, and
   a significant amount of the blue wavelengths that are reflected by said temperature sensitive liquid crystals contained in said liquid crystal compartment so as to significantly reduce the blue color in both the blue spectrum of the blue Color Range and the purple spectrum of the purple Color Range displayed by said Indicator, thereby resulting in a reduction in the width of the Color Display Range of said Indicator; and
   wherein said second mask portion is further configured to:
   allow a significant amount of the red wavelengths that are reflected by said temperature sensitive liquid crystals contained in said liquid crystal compartment to pass through and be displayed by said Indicator, wherein the red wavelengths that pass through said second mask portion are similar to the red wavelengths that are filtered out by said first mask portion thereby resulting in a contrast between the first mask portion, which blocks a significant amount of the red wavelengths, and the second mask portion, which allows a significant amount of the red wavelengths to be viewed by a user of the temperature Indicator, and
   filter out a significant amount of the blue wavelengths that are reflected by said temperature sensitive liquid crystals contained in said liquid crystal compartment so as to significantly reduce the blue color in both the blue spectrum of the blue Color Range and the purple spectrum of the purple Color Range of said Indicator, thereby resulting in a reduction in the width of the Color Display Range of said Indicator.

24. The temperature Indicator of claim 18, wherein said single liquid crystal compartment contains a single liquid crystal formulation.

25. The temperature Indicator of claim 18, wherein said single liquid crystal compartment contains at least two liquid crystal formulations.

26. The temperature Indicator of claim 18, further comprising: a magnifying optic.

27. The temperature Indicator of claim 18, further comprising:
   a viewing angle film.

28. The temperature Indicator of claim 18, wherein said cap is positioned on top of and encases said liquid crystal structure.

29. The temperature Indicator of claim 18, wherein said liquid crystal structure is positioned inside said housing.

30. The temperature Indicator of claim 29, wherein said housing is further comprised of a disc in contact with and at least partially covering a top portion of said housing.

* * * * *